United States Patent
Mangone, Jr.

(10) Patent No.: US 8,713,784 B2
(45) Date of Patent: May 6, 2014

(54) FASTENING APPARATUS AND SYSTEM

(76) Inventor: Peter G. Mangone, Jr., Golden, CO (US)

( * ) Notice: Subject to any disclaimer, the term of this patent is extended or adjusted under 35 U.S.C. 154(b) by 1030 days.

(21) Appl. No.: 12/777,774

(22) Filed: May 11, 2010

(65) Prior Publication Data

US 2010/0218360 A1  Sep. 2, 2010

Related U.S. Application Data

(63) Continuation-in-part of application No. 11/465,064, filed on Aug. 16, 2006, now Pat. No. 7,849,590.

(51) Int. Cl.
*B23P 11/00* (2006.01)
*B23P 17/00* (2006.01)

(52) U.S. Cl.
USPC ........... 29/525.01; 29/811.2; 29/809; 29/822; 140/113

(58) Field of Classification Search
USPC ............. 29/525.01, 811.2, 809, 822; 140/113
See application file for complete search history.

(56) References Cited

U.S. PATENT DOCUMENTS

| | | | | |
|---|---|---|---|---|
| 4,581,481 A | * | 4/1986 | Moretti | 174/135 |
| 4,798,231 A | * | 1/1989 | Glaus et al. | 140/119 |
| 5,020,355 A | * | 6/1991 | Payne et al. | 72/407 |
| 5,350,267 A | | 9/1994 | Mangone, Jr. | |
| 5,497,893 A | | 3/1996 | Mangone, Jr. | |
| 5,931,364 A | * | 8/1999 | Dennis | 227/109 |
| 6,298,549 B1 | * | 10/2001 | Mangone, Jr. | 29/809 |
| 6,606,786 B2 | | 8/2003 | Mangone, Jr. | |
| 6,779,241 B2 | * | 8/2004 | Mangone, Jr. | 29/446 |
| 7,617,883 B1 | * | 11/2009 | Mangone, Jr. | 173/1 |
| 2003/0218046 A1 | | 11/2003 | Mangone, Jr. | |
| 2005/0028346 A1 | | 2/2005 | Mangone, Jr. | |
| 2008/0047124 A1 | | 2/2008 | Mangone | |

FOREIGN PATENT DOCUMENTS

DE   3535942 A1   4/1987
WO   92/21839 A1   12/1992

OTHER PUBLICATIONS

Search Report issued in related application GB 0707248.1 on Jul. 13, 2007, 4 pages.

* cited by examiner

*Primary Examiner* — Peter DungBa Vo
*Assistant Examiner* — Jeffrey T Carley
(74) *Attorney, Agent, or Firm* — Drinker Biddle & Reath LLP

(57) ABSTRACT

An improved apparatus for holding multiple locking clips and applying a single locking clip to an article resting on a surface in which a pivotable feed detent lever insures that only one clip is provided at a time and the clip has a frangible member that maintains the side members of the clip in an open position until the clip reaches the articles whereupon the frangible link is broken permitting the clip to be locked about the articles.

13 Claims, 21 Drawing Sheets

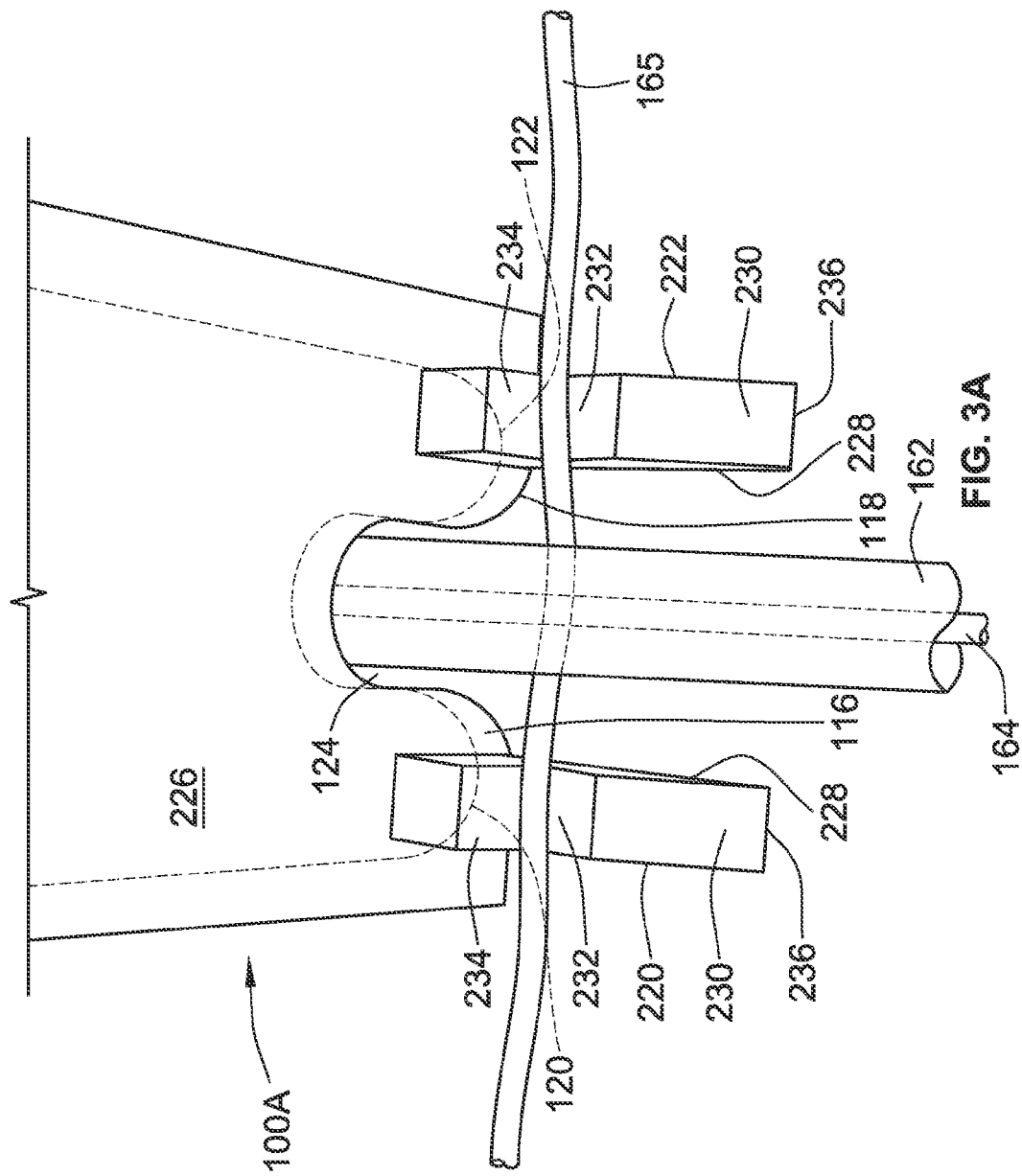

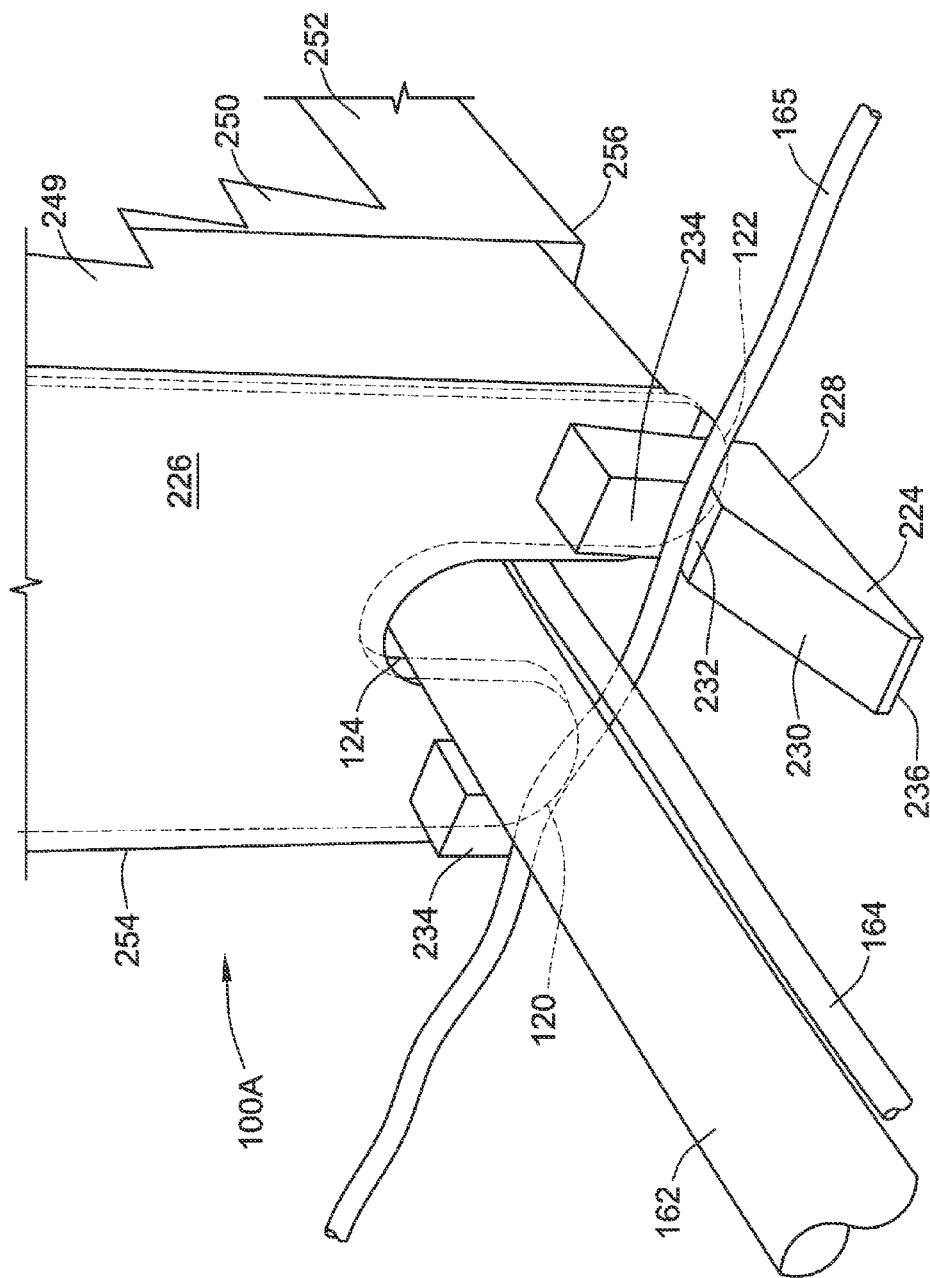

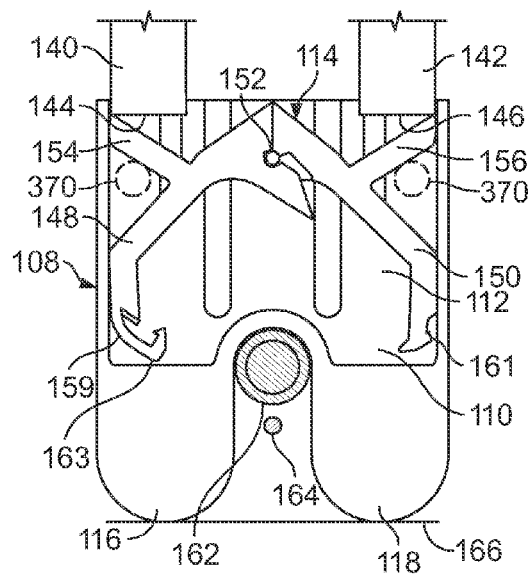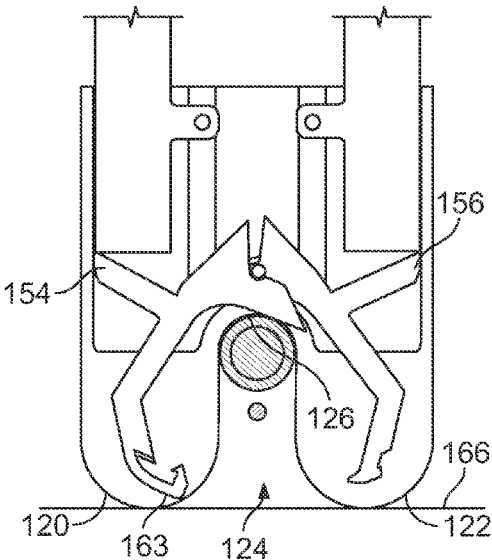
FIG. 4A  FIG. 4B
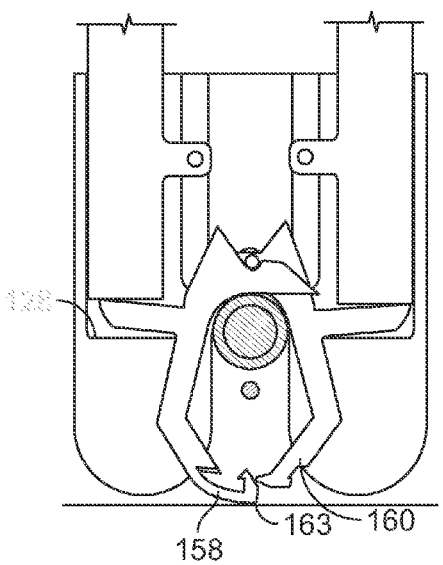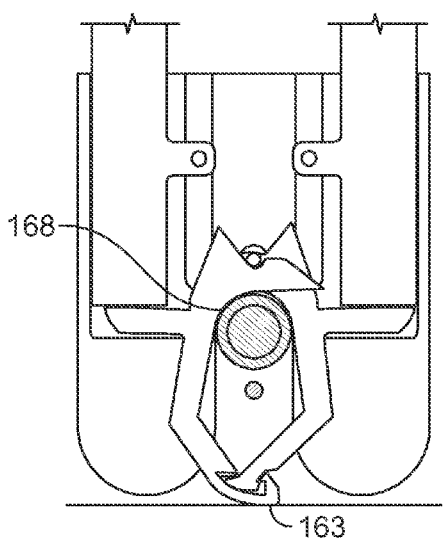
FIG. 4C  FIG. 4D

FASTENING APPARATUS AND SYSTEM

CROSS-REFERENCE TO RELATED PATENT APPLICATIONS

This patent application is a continuation-in-part of copending U.S. patent application Ser. No. 11/465,064, filed Aug. 16, 2006.

FIELD OF THE INVENTION

This invention relates generally to devices and methods for fastening at least two articles to one another and, more particularly, to an improved apparatus, an improved locking clip and method for rapidly, efficiently and reliably delivering and confining in an adjacent relationship within a locking clip and then fastening within the locking clip portions of at least two relatively rigid articles.

BACKGROUND OF THE INVENTION

It is sometimes necessary to confine portions of relatively rigid articles in a close relationship during the formation of a final product, so that relative movement is limited while the final product is being formed. For example, when cylindrical radiant heating tubing is to be provided within a concrete driveway, a supporting network in the form of a wire mesh is laid in place and the radiant heating tubing is then attached to the wire mesh as it is advanced over portions of the wire mesh in a desired, usually serpentine, relationship.

Conventionally, this attachment is accomplished with wire ties or nylon ties that are wrapped around portions of the wire mesh and adjacent portions of the radiant heating tubing before the concrete is poured and cures to form the driveway. Where additional strength is required, conventional rebar may be added to the wire mesh or used in place of the wire mesh. In other types of construction, where conventional rebar is used to strengthen structures made of concrete, rebar sections are attached together using conventional ties as or before they are moved into the desired location before pouring the concrete to form the structures. Also, in some applications a polystyrene foam board is placed below the tubing and mesh.

The application of ties in the conventional method for attachment is backbreaking work that is time consuming and can produce unreliable inconsistent results where ties are attached in a haphazard way or even are skipped to minimize the labor. Prior tools for applying fastening devices (like locking clips) to attach tubing to supporting networks fail to deliver consistently satisfactory results, frequently jam, and risk striking the foam board where used, possibly impairing the functionality of the tubing. Also, prior tools cannot tolerate irregularities in the underlying surface or a soft substrate like foam board and are slow and cumbersome to use.

U.S. patent application Ser. No. 11/465,064, filed Aug. 16, 2006, describes an apparatus for applying fastening devices in the form of locking clips that makes it possible to quickly and reliably confine portions of relatively rigid articles such as cylindrical radiant heating tubing and supporting wire mesh. The "early apparatus" of the '064 application is described below and constitutes the foundation upon which an "improved apparatus", which is both described and claimed below, rests.

Locking clips that are particularly suitable for the above applications were recently developed by the present inventor, Peter G. Mangone, Jr., and are described in his U.S. Pat. Nos. 6,298,549; 6,606,786; 6,779,241; and pending U.S. patent application Ser. No. 11/465,064, filed Aug. 16, 2006, the teaching and contents of which are incorporated herein by reference. The locking clips described in these patents and patent application (referred to in the above-noted patents, for example, as "devices for forming an enclosure"), may be generally described with reference to FIG. 1 and can be used with the early apparatus. These locking clips are generally referred to herein as the "early locking clips."

Thus, the early locking clips 10 of FIG. 1 include two side members, 12 and 14, having respective inner and outer side faces, 12A, 12B, 14A, and 14B. The two side members are generally curved as shown and have upper body portions 16 and 18 that are pivotally connected by a pivot member 20. Side members 12 and 14 have abutment portions 22 and 24 extending outwardly from the outer side faces of each of the members. Inwardly pivoting motion of the side members is achieved by applying a generally downward force to the top surfaces 34 and 36 of each of abutment portions 22 and 24 as the locking clips come into contact with the tubing (as shown for example in FIGS. 4B to 4D below).

Pivot member 20 may be a living hinge (as shown) or it can be another pivoting member as described in the above-noted patents. The pivot member clearance area 38 enables pivotal motion of the side members in substantially parallel planes from an open/receiving position to a closed/locked position. The side members are designed to lock in the closed position by way of locking portions at or near the distal ends of the side members. Preferably, once engaged the locking portions will be irreversibly locked. The locking portion of one of the two members may comprise a flexible end portion such as shown at 26 including a recess 30. The locking portion of the other of the two members may have a protruding end portion such as shown at 28 with a hook portion 32 configured to mate with recess 30, where the flexible end portion and the protruding end portion are located and configured so that application of force on the abutment portions moves the locking portions together whereupon hook member 32 enters recess 30 to irreversibly mate the locking portions. Other closing or locking configurations can be used.

Inner side faces 12A and 14A of members 12 and 14 define a fully circumscribed opening 168 (FIG. 4D) when the side members are in the locked position. The details of the locking member of FIG. 1 as well as other early locking members are described in the aforementioned '549, '786 and '241 patents which, as indicated earlier, are incorporated by reference.

The early apparatus is designed to move an early locking clip such as that of FIG. 1 from the open position to the closed position, to enclose, for example, at least two relatively rigid articles. The tool includes a feed track or magazine that supports a row of locking clips in their open position and urges the locking clips toward an end plate of the tool where the selected or leading locking clip is urged against the end plate. The end plate has a generally planer surface and a guide projecting outwardly from the planer surface toward the row of clips. The guide includes the first guiding surface and, spaced therefrom, a second guiding surface. In the tool, the clips are urged against the end plate so that a portion of at least one of the two members of the clip is facing one of the first and second guiding surfaces and a portion of the other of the two members is facing the other of the first and second guiding surfaces.

The early apparatus also includes means for applying force to the abutment portions of the spaced apart portions of the clip. The force applying means of this apparatus is located relative to the abutment portions so that the force applying means contacts the abutment portions of the clips to move them from the opened position to the closed position confining the two relatively rigid members between the inner surfaces of the clip.

The present invention comprises not only an improved apparatus but also an improved locking clip that is designed to be used in the improved apparatus. The early locking clips constitute the foundation upon which the improved clips rest. Thus, the improved method by which the improved apparatus is used in applying improved clips will reliably confine portions of at least two relatively rigid, generally cylindrical articles in an adjacent relationship using such a locking clip with interlocking pivoting members movable from an opened position to a closed position. The improved clip, apparatus and method: 1) engage and optimally lift, position, and contain the articles without separately raising the body of the improved apparatus away from the surface; 2) reliably deliver a single selected improved locking clip into position to confine the articles while maintaining the improved locking clip in its fully open position and without disturbing the supply of other locking clips held in the apparatus; 3) safely and efficiently secure the single, selected improved locking clip in the closed position about the articles; and 4) expeditiously release the single, selected closed improved locking clip and articles from the improved apparatus.

SUMMARY OF THE INVENTION

In one embodiment of the present invention an apparatus is provided to hold a series of open locking clips and deliver and apply the leading open locking clip of the series to at least one and preferably two or more articles resting on a surface. If, for example, two articles are present, one may be resting on the surface and the second article may be resting on the first article. The apparatus includes a housing with a clip cavity for receiving the leading open locking clip and a pivotal feed detent lever that bars the entry into the cavity of succeeding open locking clips until the leading clip is delivered, applied and removed from the apparatus.

The apparatus also includes a control arm linked to first and second apparatus members that is moveable between a start position and an end position to successively actuate the first and second apparatus members. The first apparatus member contains and lifts the articles into position before delivery of the leading open locking clip. The second apparatus member then delivers the open locking clip to the article, and applies and locks the locking clip to the article before removal of the clip from the apparatus. The apparatus first member may include grabber arms with inwardly directed distal ends to engage the article and hold it in a capture area between the grabber arms located above the inwardly directed distal ends of the arms. The second apparatus member may include driver arms to move the leading open clip into engagement with the article and then to close the clip about the article.

The feed detent lever of the apparatus pivots between an initial biased open phase and a barrier phase. In the initial biased open phase the leading locking clip is admitted to the clip receiving cavity. In the barrier phase, the passage of succeeding clips into the clip cavity is barred by the feed detent lever.

The feed detent lever may include a generally horizontally operating top portion that admits the leading open locking clip when the feed detent lever is in the initial biased open phase. The feed detent lever, which also includes a forwardly angled bottom portion having a ramp surface, is designed to move about a pivot between the top and bottom portions. The bottom forwardly angled portion of the feed detent lever is positioned to intercept the leading locking clip along the ramp surface when the feed detent lever is in the initial biased open phase. As the leading locking clip is delivered to the article it advances along this ramp surface causing the bottom forwardly angled portion of the feed detent lever to pivot rearwardly thereby moving the top generally horizontally operating portion downwardly to bar the passage of succeeding open clips into the clip cavity.

In another embodiment of the invention, the apparatus includes at least one foot projecting outwardly from the apparatus housing adjacent an article-receiving cavity. This foot has a top ramp surface angled upwardly from the bottom of the foot. The top ramp surface may intersect a generally horizontal landing adjacent to the housing. In the preferred embodiment, bilateral feet will be positioned on opposite sides of the article-receiving cavity. The ramp surface is designed to be slid under and thereby raise an article resting on a surface to facilitate the application and closure of a locking member delivered by the apparatus.

Improved locking clips that remain open until applied to an article constitute yet another embodiment of the invention. The open locking clips have first and second side members. Each of these side members have a first end, a second end, and a body portion located between the first and second ends. The side members also include a connecting portion at their first ends and a locking portion at their second ends. The connecting portions are pivotally attached so that the first and second members can pivot relative to one another between an open position and a locked position for enclosing the article. The connecting portions of the arms have opposite spaced faces that define a gap and a frangible link attached at its opposite ends to the opposite faces and preferably located in the gap. This frangible link maintains the first and second members in an open position until the leading clip is applied to the article.

A system also is provided in another embodiment of the invention in which a series of the above described open locking clips are stored in the apparatus. In this system the apparatus receives the leading open locking clip in a clip cavity after which the feed detent lever bars the entry of succeeding open locking clips to the cavity. The clips are then delivered to one or more articles resting on a surface while still open and they are applied to the article(s). The application of the clips involves first breaking the frangible link and then locking the first and second side members about the article in a closed clip configuration. After this, the clip is removed from the apparatus so that the process may begin again with the next clip ready for application to the next articles.

Finally, in yet another embodiment of the invention, a method is provided for fastening at least two adjacent articles resting on a surface. In this method the above open locking clip and apparatus are provided. The articles are lifted from the surface by sliding the ramp surface of the feed under the articles to raise them off of the surface after which the open clip is delivered into position to confine the articles, sufficient force is applied to break the frangible link in the clip, and the first and second side members of the clip are closed about the articles to fasten them together.

BRIEF DESCRIPTION OF THE DRAWINGS

FIGS. 3A and 3B are, respectively, front perspective and corner perspective views of a bottom portion of the improved apparatus of the invention including bilateral article-raising feet;

FIGS. 4A-4D are representations of the distal end portion of the early apparatus showing various stages in the clip closing and locking operation of the apparatus;

DETAILED DESCRIPTION OF THE INVENTION

The embodiments of the invention described in detail below are not intended to be exhaustive or to limit the claimed inventions to the precise structures and operations disclosed. Rather, the described embodiments have been chosen and described to explain the principles of the invention and their application, operation and use in order to best enable others skilled in the art to follow their teachings.

Figure 2A:
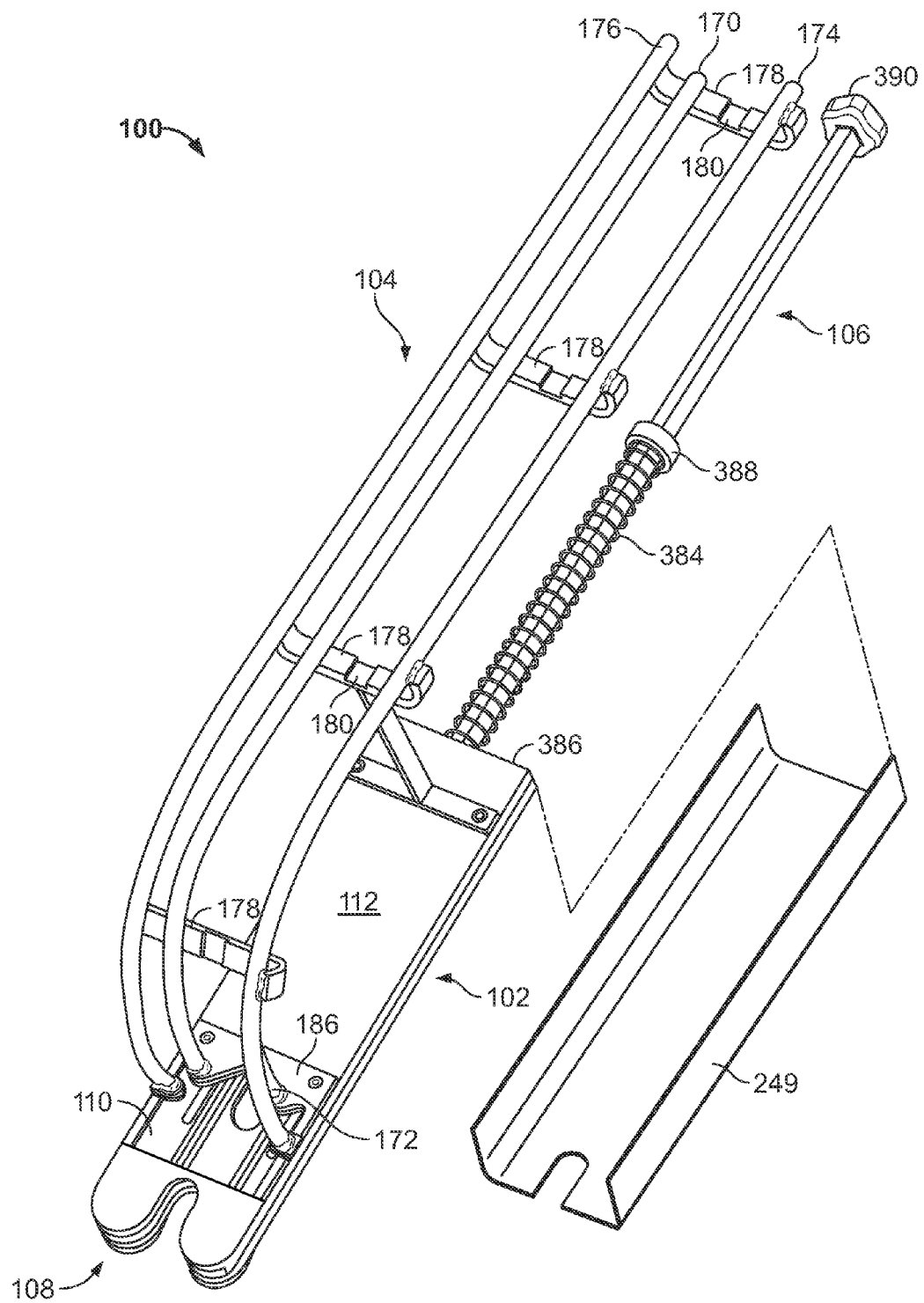
FIG. 2A is an elevation view of the back of the early apparatus.
Figure 3:
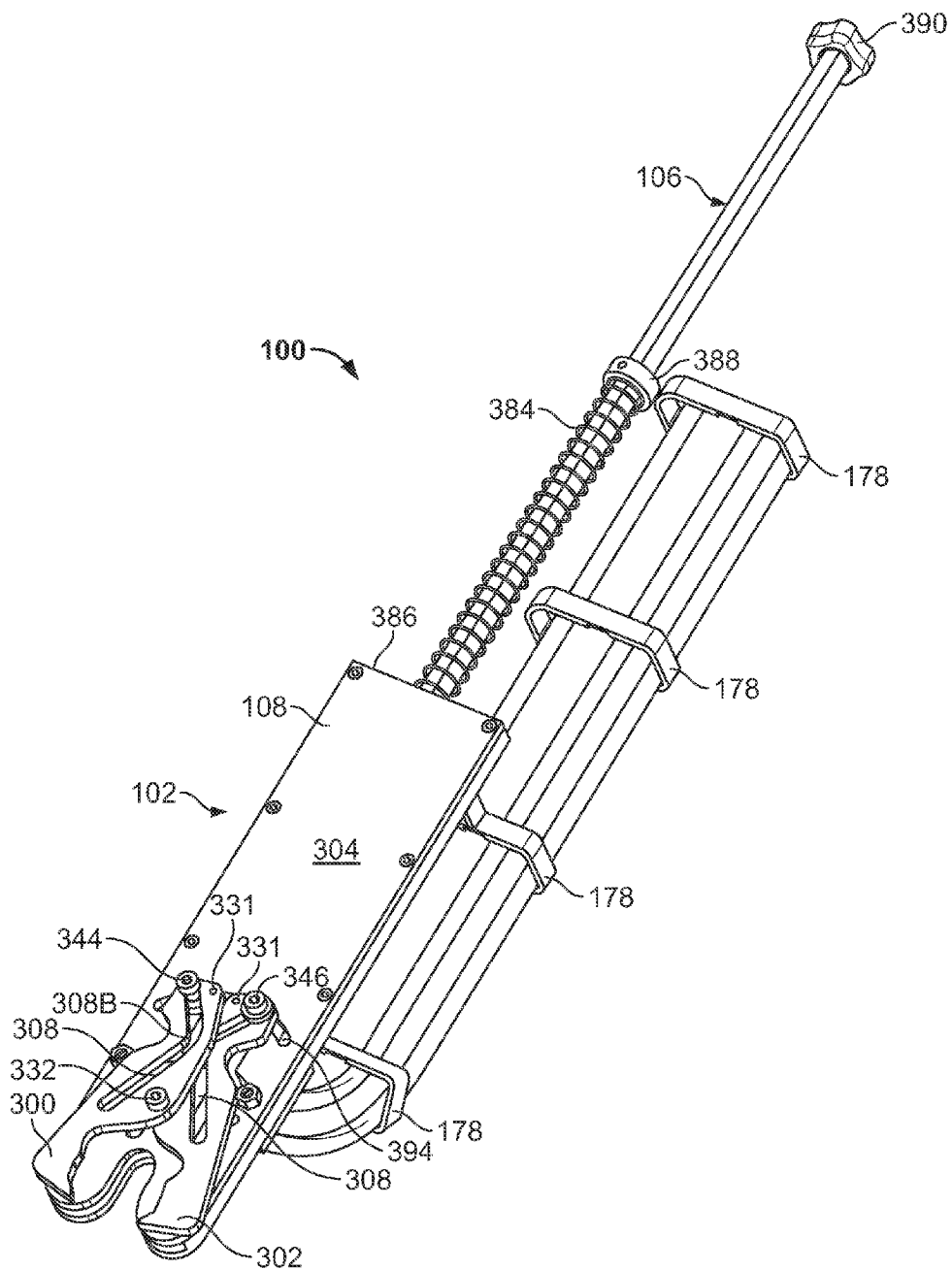
FIG. 3 is a front elevation view of the front of an apparatus in accordance with the present invention as in either the early apparatus or the improved apparatus.

An early apparatus 100 is illustrated in FIGS. 2A and 3. Apparatus 100 includes an application section or housing 102 that includes means as described below for containing and lifting relatively rigid generally cylindrical articles away from the surface supporting the articles, raising the body of the apparatus, delivering a locking clip into position to confine the articles, securing the clip in the closed position, and releasing the locking clip and articles from the apparatus. The apparatus also includes a magazine 104 for holding a plurality of locking clips and feeding those clips into the application section. Finally, the apparatus includes a push rod 106 for actuating the application section and carrying out the method of the invention.

The present invention includes an improved apparatus 100A that includes important enhancements to the early apparatus. Thus, the structure and operation of improved apparatus 100A generally correspond to apparatus 100 and, except as otherwise indicated, all of the above features of prior apparatus 100 are present in improved apparatus 100A. Apparatus 100A, however, includes at least one foot and preferably bilateral feet 220 and 222 as well as a feed detent lever 500 and associated bias means which are not present in the early apparatus. These features, which make the apparatus more reliable and its use more convenient, are shown in FIGS. 3A, 3B, 12A-12D and 13A-13D and described in connection with those figures.

Figure 6A:
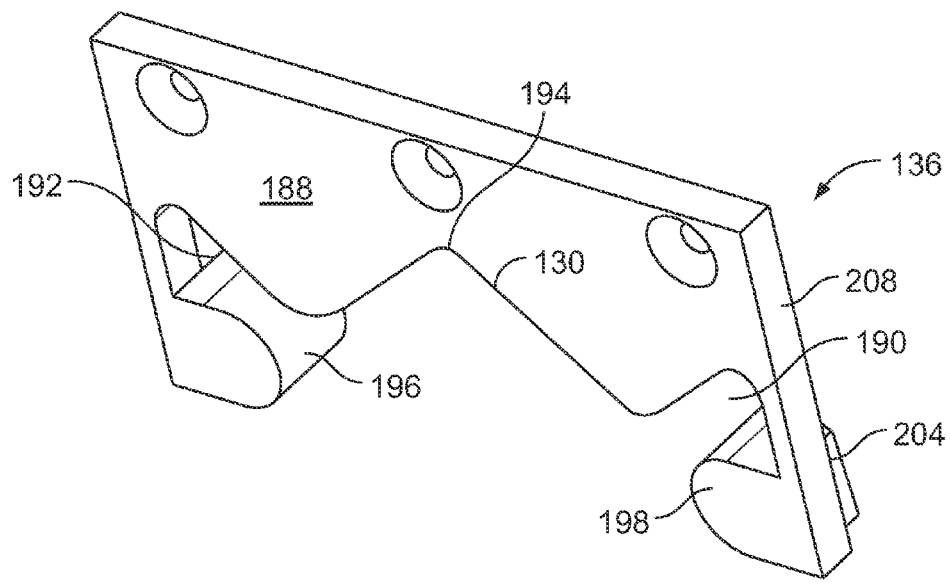
FIGS. 6A and 6B are respectively front and back views of the weldment plate of the magazine of FIG. 5.
Figure 6B:
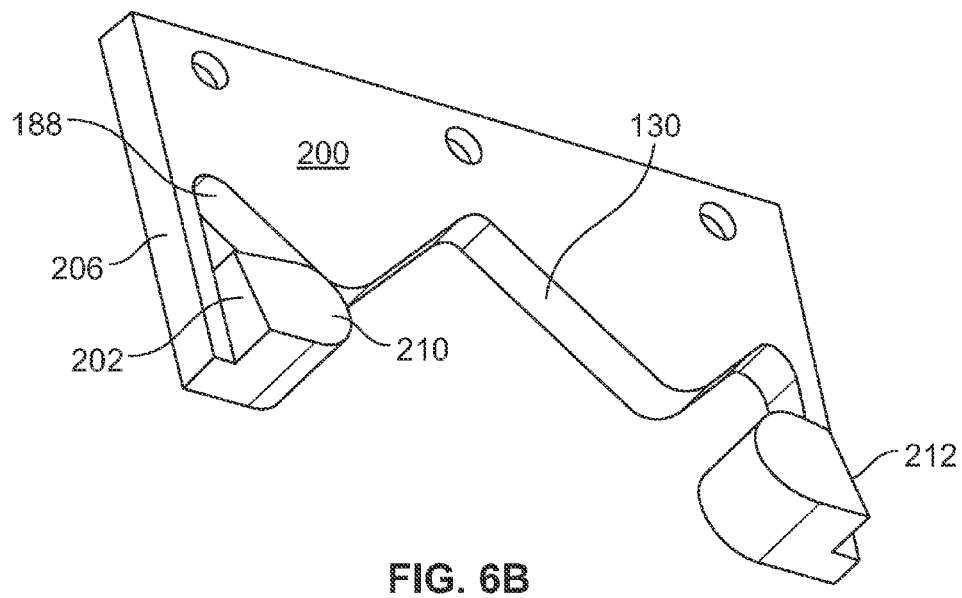
Figure 10:
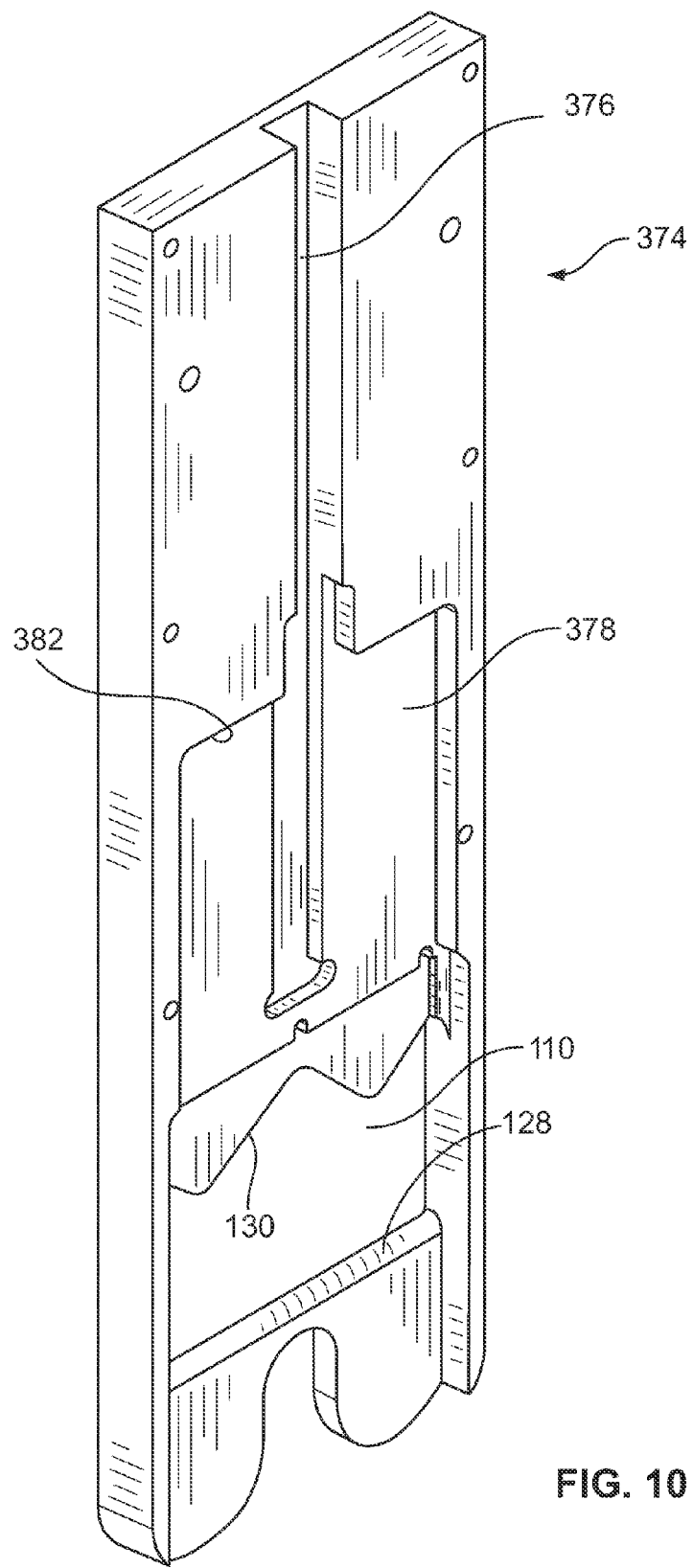
FIG. 10 is a back perspective view of a body plate of an application section of both the early and the improved apparatus.

The clip closing and locking operation of early apparatus 100 is illustrated in FIGS. 4A-4D. These figures represent a view of the distal end portion of body 108 of the application section. As shown in these figures, body 108 includes a clip cavity 110 in its outer surface 112 in which a leading early locking clip 114 is shown positioned, being delivered ready to be closed and locked, and fingers 116 and 118 at the end of the application section. As shown in FIG. 10, cavity 110 includes a lower sill 128. It also has an upper boundary 130 that is scalloped to match upper boundary 130 in FIG. 6B and to clear the upper edge of the clip to enable successive clips to enter into cavity 110. In FIGS. 4A-4D, the scalloped upper boundary has been removed to help illustrate the clip closing and locking operation.

Figure 10A:
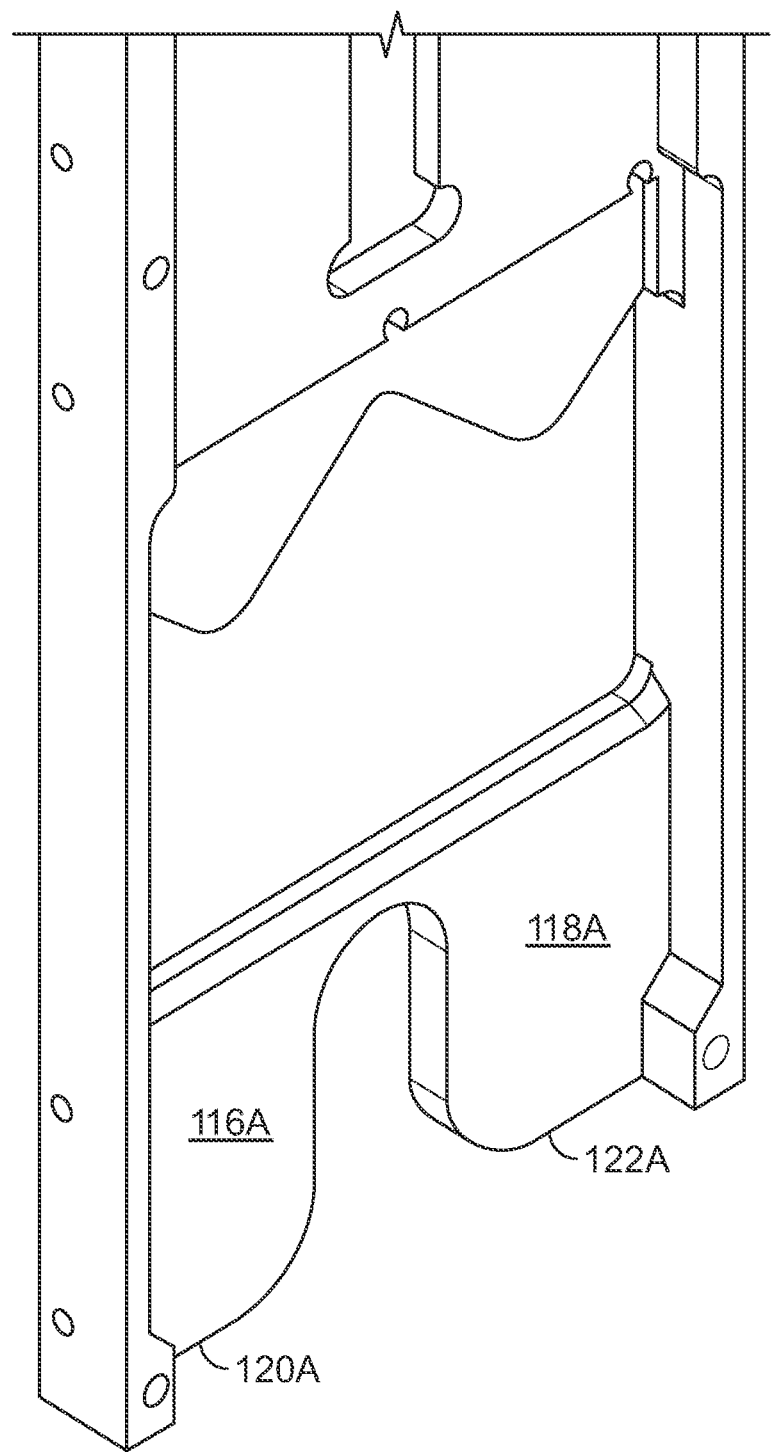
FIG. 10A is a partial back perspective view of an alternative application section in which fingers with broad flat ends as may be used in both the early and the improved apparatus and is currently preferred for use in the improved apparatus.

Fingers 116 and 118 include radiused distal ends 120 and 122 separated by a cavity 124. In the illustrated embodiment, the curved edges of the fingers gently curve into cavity 124 which is radiused at its top 126. In alternative embodiments, cavity 124 may be of other configurations. Also, distal ends 120 and 122 of fingers 116 and 118 may be of other configurations. For example, the fingers may taper downwardly to form a sharp point, a narrow flat tip, a broad flat end, or the distal ends of the fingers may be of other shapes, as desired. One such alternative design is shown in FIG. 10A where fingers 116A and 118A have broad flat ends 120A and 122A.

FIGS. 4A-4D show a portion of anus 140 and 142 of driver 138, which is more fully described and illustrated in connection with FIGS. 9A-9B. Arms 140 and 142 each have leading faces 144 and 146. A first clip 114 shown in these figures includes outer members 148 and 150 pivotally connected at their proximal end by a pivot member in the form of a living hinge 152. The outer members have abutment portions 154 and 156 projecting generally outwardly from the outer surfaces of each of the clip members for engagement by leading flat faces 144 and 146 of driver 138. Additionally, the distal ends of the clip members have first and second interlocking portions 158 and 160. Finally, the outer leading edges 159 and 161 of the outer members are curved toward the centerline of the clip.

Figure 1:
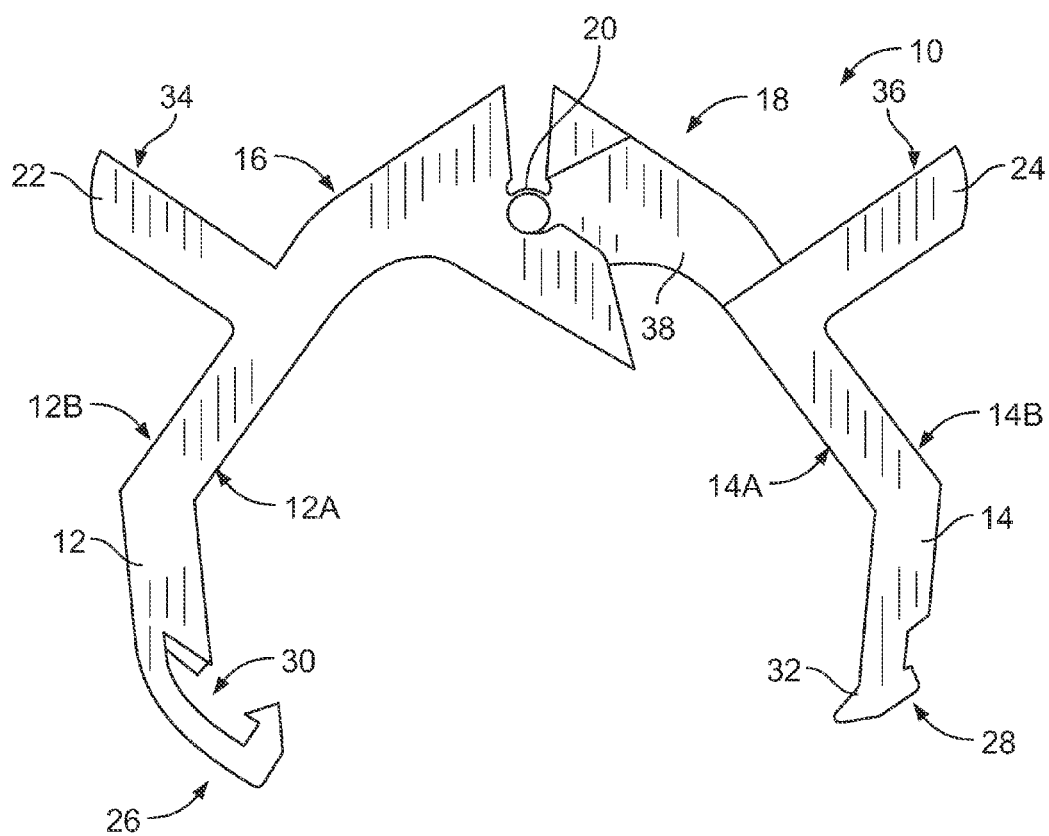
FIG. 1 is a front elevation view of a prior art locking clip that may be used in the early apparatus.
Figure 1A:
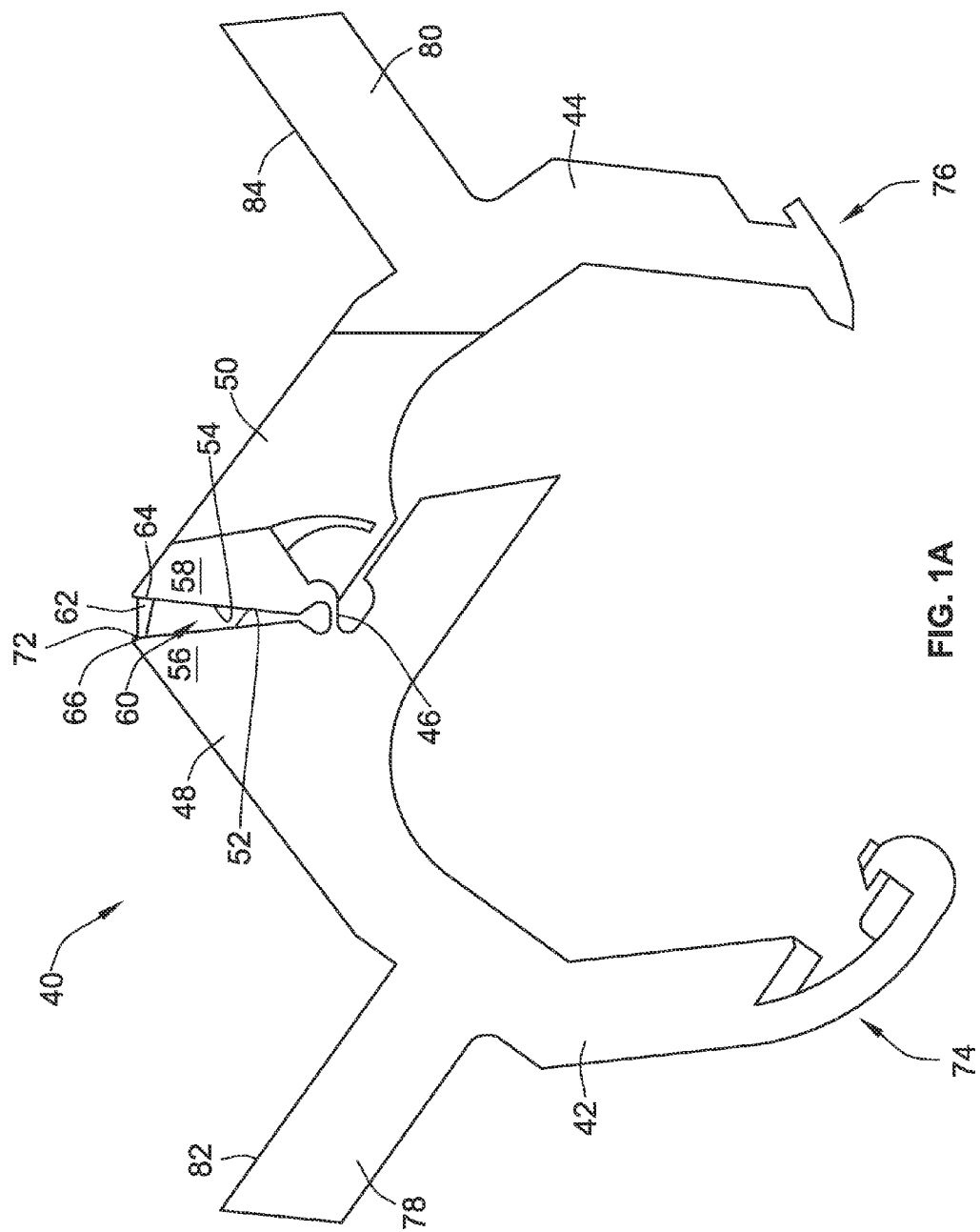
FIG. 1A is a front elevation view of an improved locking clip designed to be used in the improved apparatus of the present invention.

An improved locking clip (or fastening device 40 for forming an enclosure) in accordance with the invention is shown in FIG. 1A. Locking clip 40 includes first and second side members or movable arms 42 and 44 joined by a living hinge 46 as described above in connection with early clip 10. In a preferred embodiment of this invention, members 42 and 44 are integrally molded using a plastic material such as polyethylene, nylon or another plastic material having similar characteristics including particularly the ability to form an integral living hinge between the two members.

The improved locking clip includes upper arm portions 48 and 50 at the top of members 42 and 44. The arm positions have opposite spaced faces 52 and 54 that are generally perpendicular to surfaces 56 and 58 of the side members. A gap 60 is defined between opposite faces 52 and 54 and extends to living hinge 46.

Figure 1B:
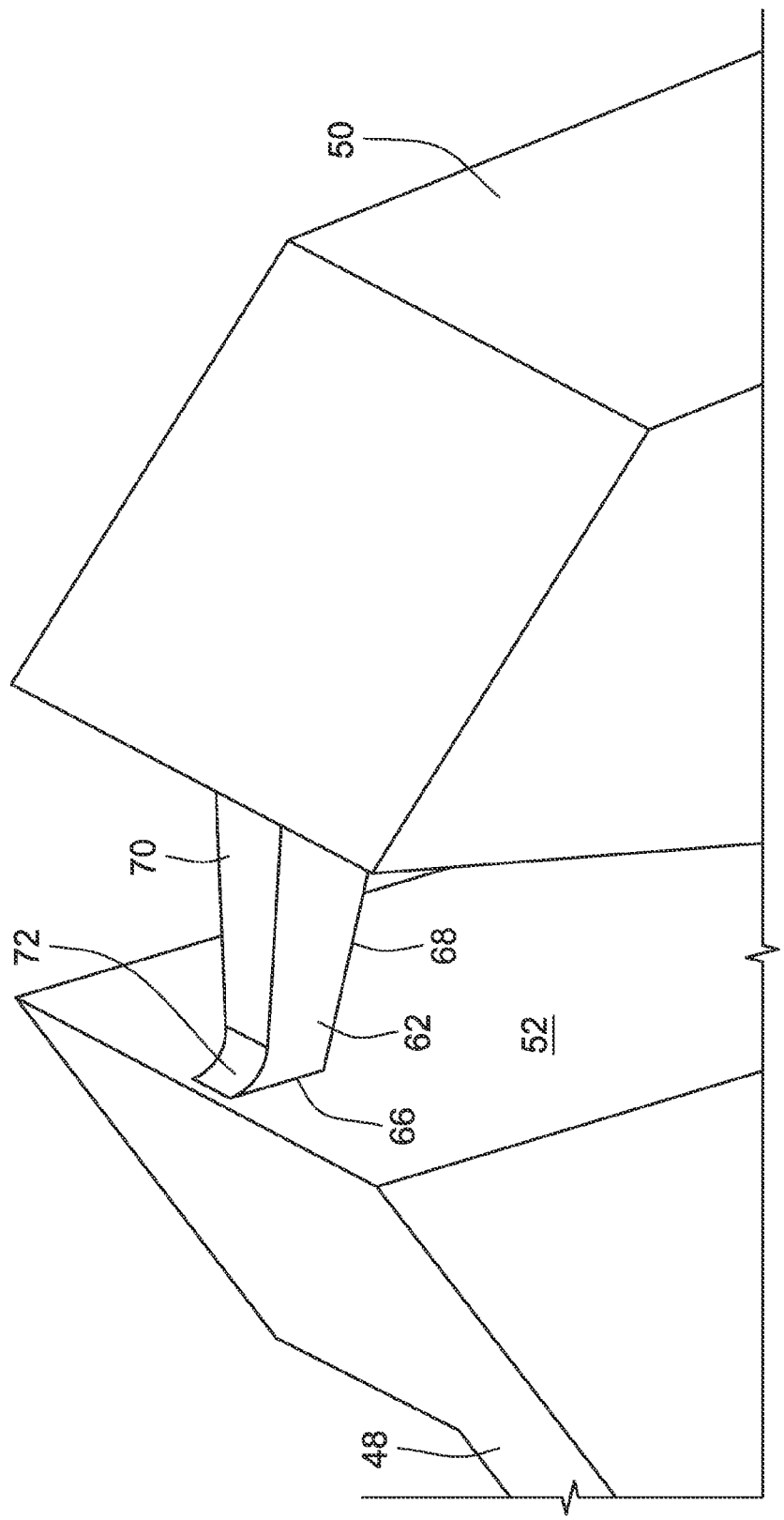
FIG. 1B is a partial enlarged perspective view of the top portion of the improved locking clip of FIG. 1A showing a frangible link located in the gap between upper opposed faces of the side members of the clip.

A frangible link 62 is formed when the improved locking clip is made so that it is integral with arm portions 48 and 50. The frangible link is located in gap 60 and it is preferred that it be located near the top of the gap. Preferably the frangible link is funnel shaped as shown in FIGS. 1A and 1B, that is, with a base 64 having a larger cross-section than its top 66 so that the inner and outer frangible link walls 68 and 70 taper as the link extends from one abutment to the other. Also, preferably a radius 72 (shown in exaggerated aspect in FIG. 1B) is formed at the outer juncture of wall 70 with surface 52 to reduce stress and prevent premature breakage of the frangible link.

The purpose of the frangible link is to prevent premature closure of open pivotably connected members 42 and 44. Thus, as will be explained in more detail below, when a downwardly directed force is applied to the locking clip at abutment surfaces 82 and 84 of abutment portions 78 and 80 to move the device downwardly in the apparatus for applying the clip, frangible link 62 will prevent members 42 and 44 from moving about the living hinge and with respect to each other until the locking clip is in its final preclosure position with side members 42 and 44 against the articles to be confined by the clip. When the open clip is in this final preclosure position, the application of further downwardly directed pressure at abutment surfaces 82 and 84 will produce a pivoting force at living hinge 46 moving faces 52 and 54 away from each other and causing the frangible link to break away generally near its top 66. When this happens, side members 42 and 44 are able to close and interlock in the same fashion as early clip 114 as described in connection with FIGS. 4B-4D.

It should also be noted that frangible link 62 may be used with any hinged locking clip with side members that pivot at or near their top and interlock at or near their bottom and abutment portions for applying an inwardly closing force to the side members to prevent the side members from closing or interlocking prematurely.

Turning now to FIG. 4A, early clip 114 (of FIGS. 4A-4D and 5) is shown ready for application, with driver arms 140 and 142 adjacent to abutment portions 154 and 156. Clip 40 of FIG. 1A may alternatively be used in this apparatus to obtain an improved result in which premature closure is prevented, as discussed below.

Two relatively rigid generally cylindrical articles are shown in cross section in the area between the clip arms in the form of rubber radiant heating tubing 162 (e.g., PEX tubing) and steel wire mesh 164. The top of the cavity 124 in this preferred embodiment has a radius 126 sufficient to contain the outer radius of the upper radiant heating tubing 162 enabling it to rest snugly within the cavity. Finally, distal ends 120 and 122 of fingers 116 and 118 are shown resting against a generally flat surface 166 such as a polystyrene foam board on the surface of a driveway before application of concrete (not shown) which is to cover the radiant heating tubing and wire mesh. It should be noted that in many applications the supporting surface will be irregular or strewn with aggregate or debris.

In FIG. 4B, driver arms 140 and 142 are shown partially advanced to move early clip 114 downwardly (past a ball detent as will be explained in further detail below), placing it in an ideal position vis à vis the wire mesh and radiant heating tubing which has been lifted by the grabber arms up into cavity 124 in an earlier step in the use of the apparatus. As can be seen in this figure, the inner surface of the clip engages the radiant heating tubing which limits further downward movement of the clip.

Next, in FIG. 4C, the driver is shown advanced further downward with arms 140 and 142 pressing against abutment portions 154 and 156 causing outer members 148 and 150 of clip 114 to pivot inwardly until interlocking portions 158 and 160 just touch. As can be seen in this figure, the interlocking members clear surface 166 below the fingers.

Finally, in FIG. 4D, clip driver 138 is shown advanced to its lowermost position, causing the interlocking portions to irreversibly interlock as shown. This produces a fully circumscribed opening 168 between the outer members, confining the radiant heating tubing and wire mesh in an adjacent relationship. In a preferred embodiment, corners 163 of the clips are rounded to minimize the likelihood that the clips will catch on the supporting surface or debris present thereon as the side members pivot inwardly to the closed position.

In practice, steps 4A through 4D are preferably performed in a continuous, even motion. (Indeed, as discussed below, the full range of the operation of apparatus 100 is preferably accomplished with continuous, even motion.) Also, the size of the clip in its closed position vis-à-vis the outer diameters or cross-sections of the confined articles will determine how snugly the confined articles are held in the confining opening. Therefore, if a snugger fit is desired, a smaller clip will be used. Finally, while early apparatus 100 (as well as improved apparatus 100A) can be used to confine relatively rigid generally cylindrical articles (like rubber hose, wire, metal rods, etc.) in an adjacent relationship, either apparatus may be used with articles of other shapes and indeed, it may also be used with articles that are not relatively rigid.

Figure 5:
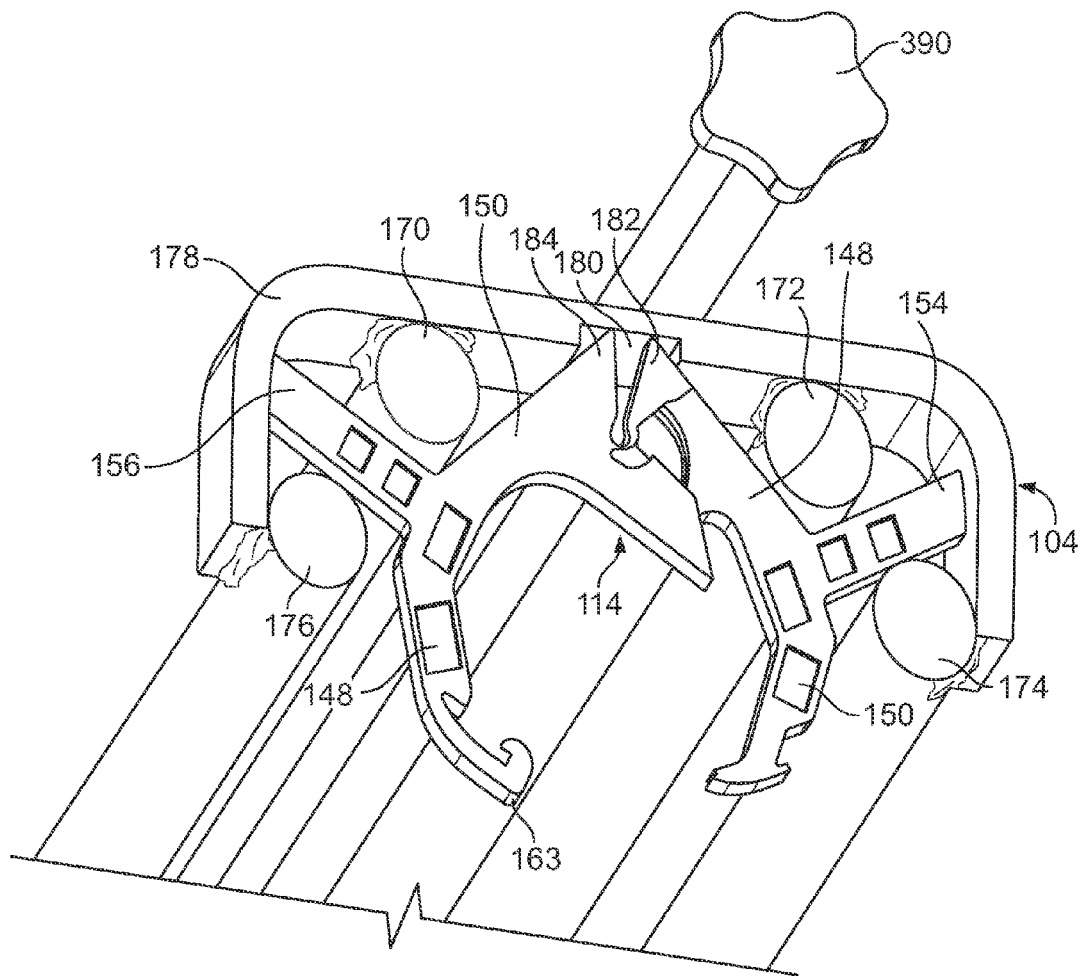
FIG. 5 is a partial top perspective view of a clip holding magazine as in both the early and the improved apparatus.

FIG. 5 is a top view of magazine 104 of apparatus 100. In this view, inner tubing supports 170 and 172 and outer tubing supports 174 and 176 are seen in end view, welded to tubing supports 178. Tubing supports 178 include notches 180 to provide clearance for the clips as they are inserted and move into position as the magazine is loaded. Thus, one such early locking clip 114 is shown in FIG. 5 with the proximal tips 182 and 184 of each of its outer members 148 and 150 resting in notch 180 and abutment portions 154 and 156 resting in the space between the pairs of adjacent inner and outer support tubing. (The improved clips will, of course, rest in the magazine in the same fashion as the early clips.) A series of clips (not shown) will be loaded into the magazine so that they slide down along the inner and outer tubing supports with the leading clip resting in application section 102 (FIGS. 2 and 3) and succeeding clips abutting each other and extending upwardly from the end of the magazine along the inner and outer support members. This insures a supply of clips which can be quickly applied in successive locations as desired by the operator of the apparatus. While the clips will move into place and remain ready to be fed into the apparatus under the force of gravity, the clips may also be positioned and fed by applying a spring loading (not shown) against the topmost clip in the magazine.

As can be seen in FIG. 2, the magazine tubing supports are fastened (for example by welding as shown) to a weldment plate 186 that is attached to the outer surface 112 of body 108 of the application section. Weldment plate 186 is shown in front and back views respectively in FIGS. 6A and 6B. Thus, the front surface 188 of the weldment plate is generally flat and includes holes for accepting screws for attaching the plate to the outer surface 112 of the application section. The plate is scalloped along its upper boundary 130 to admit clips past the plate into the body of the application section, with clip abutment portions 154 and 156 passing through slots 190 and 192 in the plate and the top of the clip clearing the central scallop at point 194. Finally, weldment plate 186 includes two inwardly directed fingers 196 and 198 which protrude from the back surface 200 of the plate. These fingers have flats 202 and 204 set back from the outer edges 206 and 208 of the plate to facilitate positioning of the plate in cavity 110 of the application section. The generally flat back faces 210 and 212 of fingers 196 and 198 are spaced from back cover 304 (FIG. 11) and beveled as shown. Beveled faces 210 and 212 cooperate with detents 370 located opposite the finger faces to hold and properly pre-position successive clips in place until needed, as will be explained below.

Figure 7:
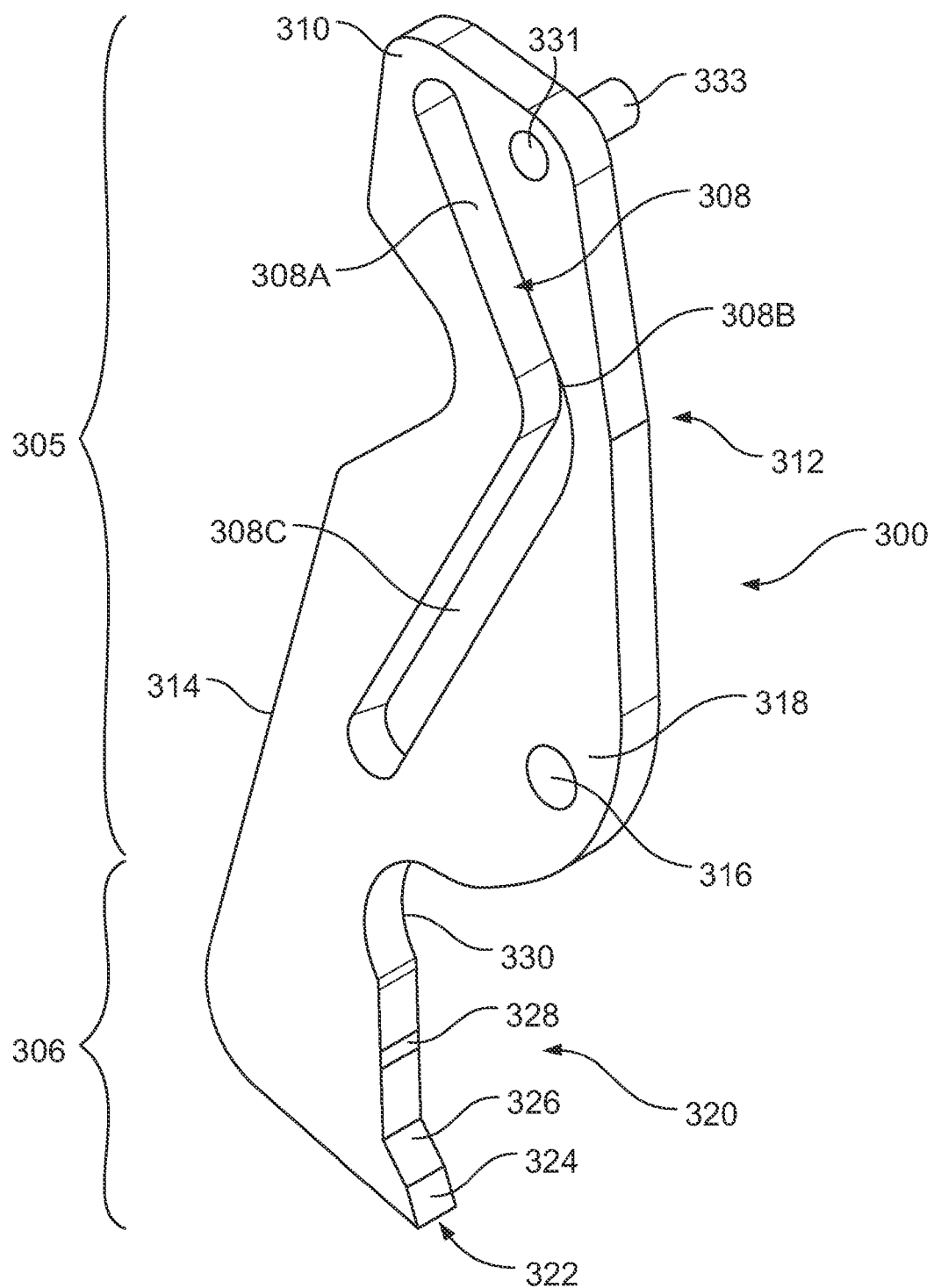
FIG. 7 is a perspective view of a grabber arm which may be used in both the early and the improved apparatus.

Turning the apparatus over to the view shown in FIG. 3, two overlapping grabber arms 300 and 302 are shown pivotally attached to cover 304 of body 108 of application section 102. Each of the grabber arms is a generally identical mirror image of the other. Thus, a representative grabber arm 300 is illustrated in FIG. 7 and includes a control section 305 and a lifting section 306. The control section has a broad generally V-shaped slot 308 which runs from the top outer corner 310 of the grabber arm to the mid-inner surface 312 of the control section and back toward the bottom outer edge 314 of the control section. A pivot hole 316 is positioned in the lower inner corner 318 of the control section.

Lifting section 306 includes a guide surface 320 beginning with a chiseled end 322 having a leading bevel 324, followed by a trailing bevel 326 and a generally curved surface 328 leading to a radiused opening 330. (In the illustrated embodiment, opening 330 is dimensioned to accept tubing 162). Ends 322 may be radiussed or beveled to minimize potential interference with substrates like polystyrene foam board. The grabber arms are mounted for overlapping pivotal movement by a pivot pin 332 (FIG. 3) that passes through the pivot holes 316 of the two grabber elements. Also, bore 331 accepts a guide pin 333 that engages arcuate slot 394 (FIGS. 3 & 11) in the cover of application section 102.

The action of the grabber arms 300 and 302 is illustrated in FIGS. 8A-8D. Thus, early apparatus 100 is positioned on surface 166 bearing articles (not shown) that are to be confined in a clip to be applied with the device. As a downwardly directed force is applied to push rod 106 in apparatus 100 (or apparatus 102), the grabber arms pivot inwardly to the position shown in FIG. 8B, so that chiseled ends 322 clear the inner edge 334 running along cavity 124. The chisel tips of the grabber arms are thus poised to initially engage heating tubing 162 and wire mesh 164 below the tubing (FIG. 4A). The grabber arms continue pivoting to ride under the wire mesh below the tubing reaching the position shown in FIG. 8C where the chisel tips are opposite each other.

Figure 8B:
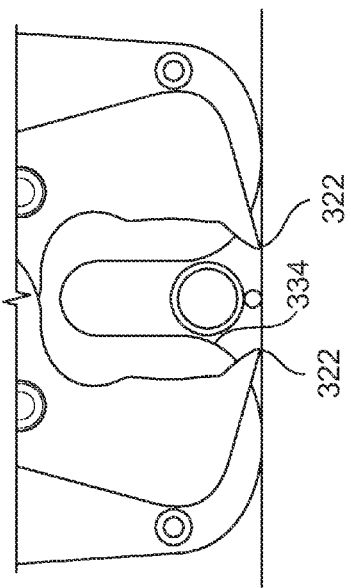
FIGS. 8A-8D are representations of the action of grabber arms which may be used in both the early and the improved apparatus.
Figure 8D:
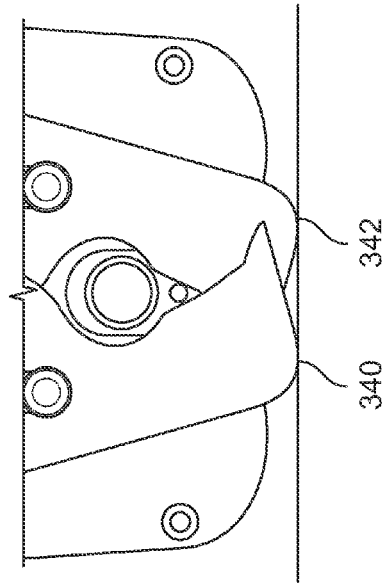

At this point, the grabber arms contain the heating tubing and wire mesh portions which have been lifted away from surface 166 by the scissors action of the grabber arms. The articles are then held in a capture area between the grabber arms, above the inwardly directed distal ends of the grabber arms. As can also be seen in FIG. 8C (and FIG. 4C), the grabber arms have begun to lift the entire apparatus away from supportive surface 166 through the pivoting action of their bottom edges 336 and 338 against the supporting surface. The grabber arms continue pivoting to their final fully closed position as shown in FIG. 8D where the corner radii 340 and 342 of bottom edges 336 and 338 lift the apparatus to its maximum spacing from the support surface. This lifting action facilitates the scissors action of the grabber arms as they sweep around to their fully closed position and provides clearance from debris or aggregate on the supporting surface. Also, the corner radii provide secure footing for the apparatus on irregular supporting surfaces.

As will be explained below, bilateral feet 220 and 222 of apparatus 100A will in most cases have raised the grabber arms above surface 166 so that corner radii 340 and 342 of bottom edges 336 and 338 will not lift apparatus 100A. Thus, the improved apparatus employs the grabber arms, scissors action, etc. of the early apparatus, but does not generally rely on the grabber arms to lift the apparatus away from the supportive surface. The improved apparatus rather relies on bilateral feet 220 and 222 to lift the tubing and wire mesh before operating the apparatus including the clip manipulation achieved by scissors action of the grabber arms.

Figure 8A:
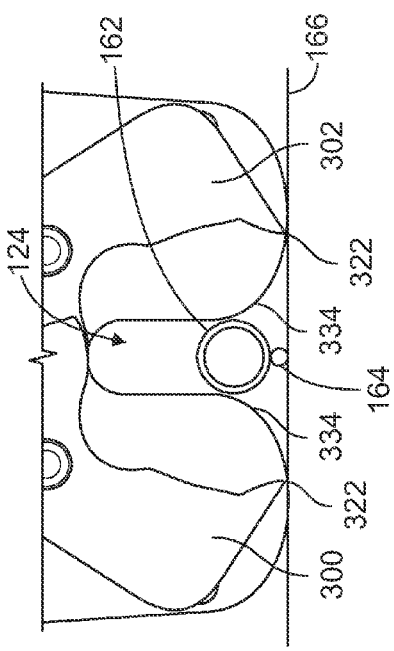
Figure 8C:
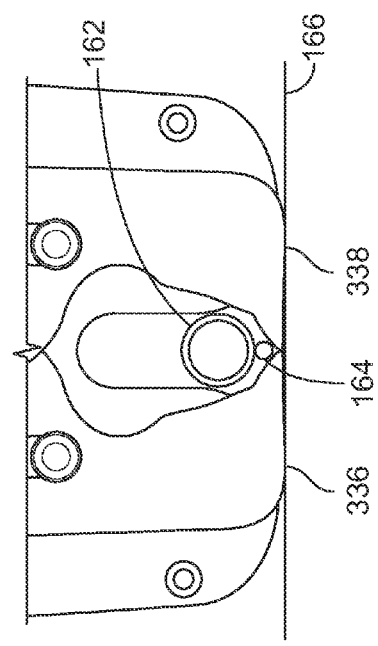

The pivoting movement of grabber arms 300 and 302 is achieved by the cooperation of pivot pin 332 and the movement of link pins 344 and 346 that are attached to bores 360 and 362 of clip driver 138. The clip driver thus moves the pins in slots 308 of each of the grabber arms as it also operates on clip 114. The link pins are in the location depicted in FIG. 3 when the grabber arms are positioned as shown in FIG. 8A. As the link pins move downwardly in slots 348 and 350 of body cover 304 (FIG. 11) they also engage the first leg 308A of slot 308 of the grabber arms causing the arms to pivot inwardly through the stages depicted in FIGS. 8A-8C, as the slots are re-oriented to follow the movement of the link pin. This continues until the grabber arms reach the position depicted in FIG. 8D and the link pins reach the transition point 308B in the slots. At the transition point, the second legs 308C of the slots will be aligned with slots 348 and 350, so that further downward movement of the link pins will not produce further pivoting action of the grabber arms and will ensure that the grabber arms remain in the position depicted in FIG. 8D.

In improved apparatus 100A illustrated in part in FIGS. 3A and 3B, bilateral feet 220 and 222 project outwardly from surface 226 of a front cover 249 (FIG. 2A) positioned on opposite sides of cavity 124. Such a front cover, but without feet, optionally may be used in the early apparatus, as seen in FIG. 2A. This cover serves not only in supplying a surface for the attachment of the bilateral feet but it helps protect the internal workings of the improved apparatus from any grit and debris present at the application site.

Each of feet 220 and 222 include a generally flat bottom surface 228 that projects generally perpendicularly from surface 226, a top ramp surface 230 that angles upwardly from the bottom surface and an optional generally flat landing 232 that intersects the top ramp surface, is generally perpendicular to surface 226, and abuts a back wall 234. Preferably surface 228 will be spaced below distal ends 120 and 122 of fingers 116 and 118 of the apparatus. The spacing preferably will be about 0.15 to 0.35 inches and most preferably will be about ¼ inch. The angle between the ramp surface and the bottom surface preferably will be about 15 to 45 degrees and, more preferably will be about 22 to 35 degrees, and most preferably will be about 28.6 degrees.

Figure 2B:
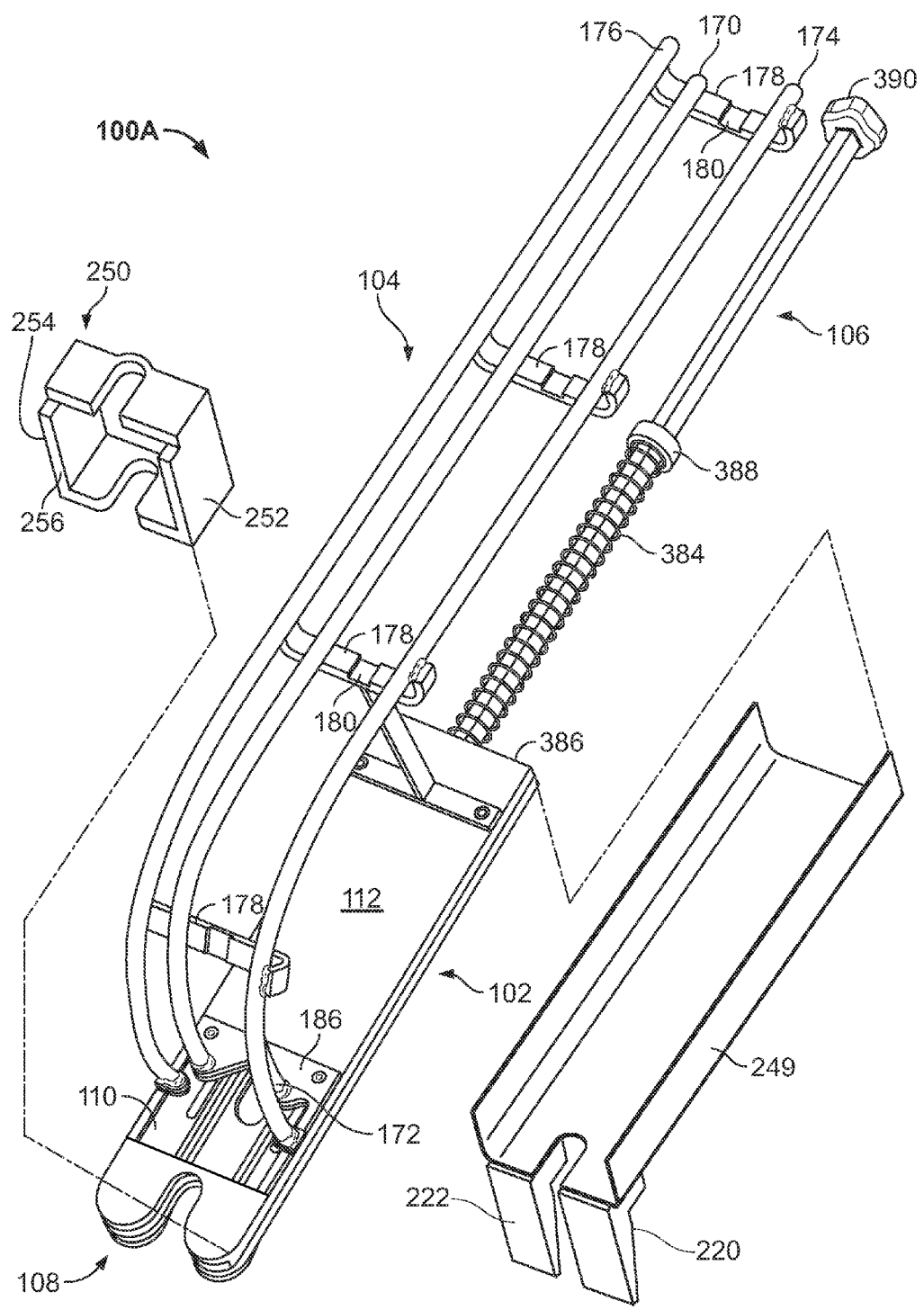
FIG. 2B is an elevation view of the back of the improved apparatus of the invention (which in this figure appears identical to the early apparatus when front cover and rear block are removed as shown)

Additionally, improved apparatus 100A preferably will also be provided with a rear support block 250 affixed to the back of the apparatus, as represented in FIG. 2B. This block will include sidewalls 252 and 254 each with a generally flat bottom surface 256 that is aligned with bottom surfaces 228 of the bilateral feet as best seen in FIGS. 3A and 3B, so that when the tool is in position the relatively rigid generally cylindrical articles will be well supported above the underlying surface as discussed above.

Thus, improved apparatus 100A will be positioned on a supporting surface such as surface 166 of FIG. 4B by sliding feet 220 and 222 under wire 165 of wire mesh 164 by positioning the forward tips 236 of the feet adjacent to the wire, and pushing forward so that wire 165 rides up along ramps 230 until it comes to rest on landing 232 against rear walls 234 thereby also raising both wires 164 and 165 (which are typically welded together). Because surface 228 is spaced below distal ends 120 and 122 of fingers 116 and 118, the distal ends of the fingers will also be spaced above surface 166. Since tubing 162 rests on top of the wire mesh, raising the wire mesh off the support surface in this fashion will also raise the tubing, pre-positioning the tubing and the wires in cavity 124 of the apparatus as shown in FIGS. 3A and 3B.

When bilateral feet are present as in apparatus 100A, lifting section 306 will operate generally as described above, except that, as noted earlier, the grabber arms will not lift the entire apparatus up from supporting surface 166 since the body of the apparatus is already positioned above the surface by bilateral feet 220 and 222. This makes it easier to operate the apparatus. Also, in the event that the supporting surface is irregular and a portion of the surface (or debris on the surface) projects upwardly on the surface behind the feet, the grabber arms may still lift the apparatus away from such an upwardly projecting surface portion or debris.

Figure 9A:
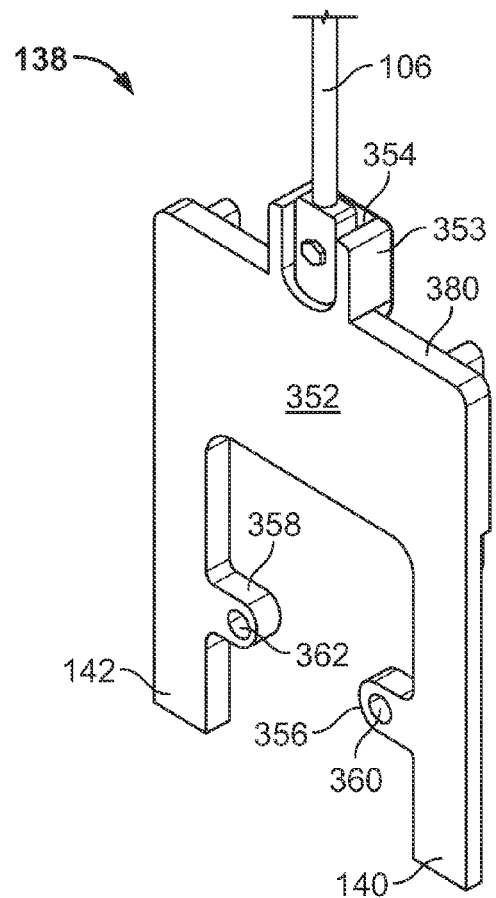
FIGS. 9A and 9B are respectively front and back perspective views of a clip driver which may be used in both the early and the improved apparatus.
Figure 9B:
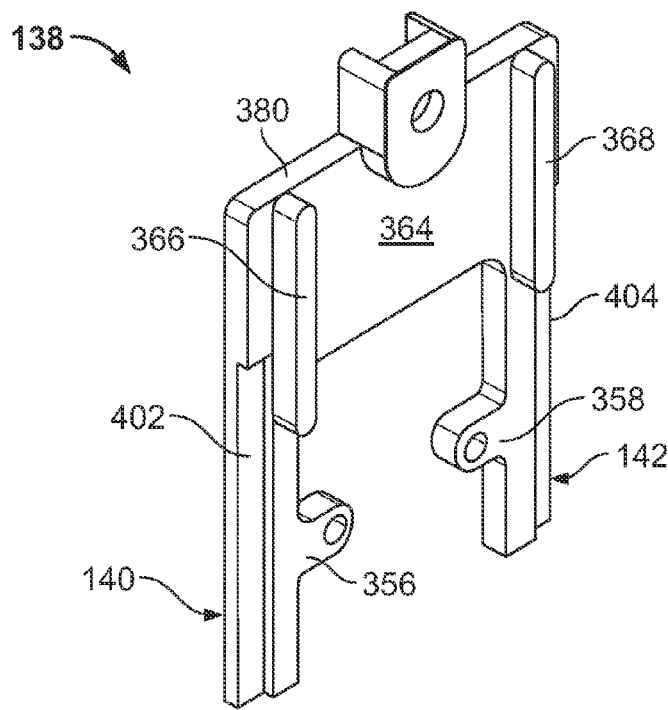

FIGS. 9A and 9B illustrate respectively the front and back surfaces of driver 138. As can be seen from the FIG. 9A, the back surface 352 of driver 138 is generally flat. An attachment member 353 extends upwardly from the top of the driver and has a recess 354 for receiving and attaching the distal end of push rod 106 to the driver. Driver 138 has two downwardly directed arms 140 and 142, and ears 356 and 358 that project into the space between the arms. These ears have threaded bores 360 and 362 that accept threaded link pins 344 and 346 to operate the grabber arms as described above.

Figures 11, 11A:
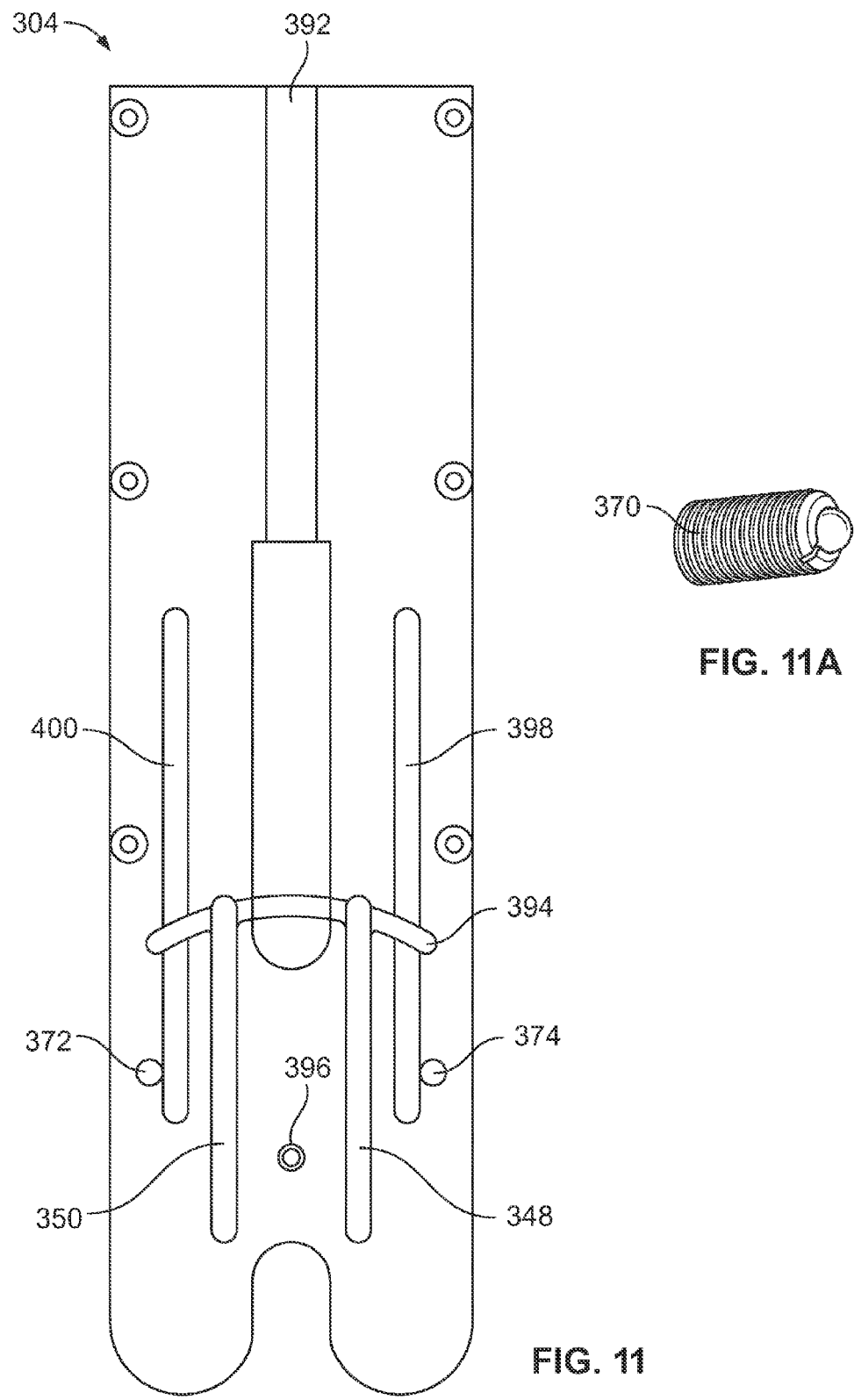
FIG. 11 is a cover intended to be joined to the body plate of FIG. 10.
FIG. 11A is a perspective view of a spring loaded ball detent intended to be mounted in the cover of FIG. 11 when it is used in the early apparatus.

Turning to the front of the driver in FIG. 9B, it is seen that the front surface 364 of the driver has standing ribs 366 and 368 that mesh with slots in body cover 304 of application section 102 (FIG. 11). Additionally, the outer edges of the back surface of each of the arms has been undercut to provide open clearance slots 402 and 404 for ball detents 370 (FIG. 11A) that hold the early locking clips in place in the early apparatus before they are applied.

Turning now to FIG. 10, the body plate 374 of application section 102 is shown. The body plate includes a central slot 376 permitting up-and-down movement of the push rod and a cut-out 378 for receiving the driver 138 in its topmost unengaged position, in which the top edge 380 of the driver (FIGS. 9A-9B) engages the top edge 382 of the cavity under the urging of the spring loading of the controller arm.

This spring loading is provided by a coil spring 384 that encircles rod 106 between the top edge 386 of application section 102 and a collar 388, as illustrated in FIGS. 2A and 3. In order to operate grasping and fastening apparatus 100, the operator places application section 102 in position and presses down on knob 390 at the proximal end of rod 106 to move the rod downwardly from the resting position shown in FIGS. 2 and 3 until the operation of the apparatus is completed. The operator then permits the rod to return to its resting position under the force of sprig 384.

FIG. 11 shows body cover 304, as viewed from the inside. The body cover includes a clearance slot 392 for the push rod corresponding to slot 376 in back plate 372. An arcuate through slot 394 is formed in the body cover to receive guide pins 331 of the grabber arms to guide the arms in the desired pivoting motion. The body cover also has a threaded pivot bore 396 for attaching pivot pin 332. Additionally, parallel slots 398 and 400 are located adjacent driver arms 140 and 142 of driver 138 (FIG. 9A). These slots receive ribs 366 and 368 of the driver to ensure that it moves up and down within the grabber body consistently and in a direction parallel to the longitudinal axis and the elongated sides of the device. Additionally, there are parallel through slots 348 and 350 in the body cover positioned inside of the outer slots, spaced apart a distance corresponding to the spacing between threaded bores 360 and 362 in ears 356 and 358 of the driver to accept link pins 344 and 346.

Finally, in the early apparatus spring loaded detents 370 (FIG. 11A) are fitted into threaded bores 372 and 374 in the body cover. These ball detents cooperate with flat back faces 210 and 212 of weldment plate 138 to prevent premature clip release thereby ensuring that the leading clip is in position ready to be applied when needed. Thus, when driver 138 engages the leading clip, it initially pushes the clip past the resistance provided by the spring loaded ball detents. Open slots 402 and 404 in driver 138 (FIG. 9B) permit the driver to move downwardly past the ball detents without interference. The improved apparatus includes a feed detent lever 500 which eliminates the need for the ball detents.

FIGS. 12A-12D and 13A-13D are partial views of portions of improved apparatus 100A of the invention that illustrate how the improved apparatus ensures that only a single selected leading locking clip 40A is delivered into position to confine the articles without disturbing the supply of the other locking members held in magazine 104 of the apparatus. Feed detent lever 500 is the key to this feature of the invention and is shown in enlarged cross section in FIGS. 13A-13D which correspond respectively to FIGS. 12A-12D.

Figure 13A:
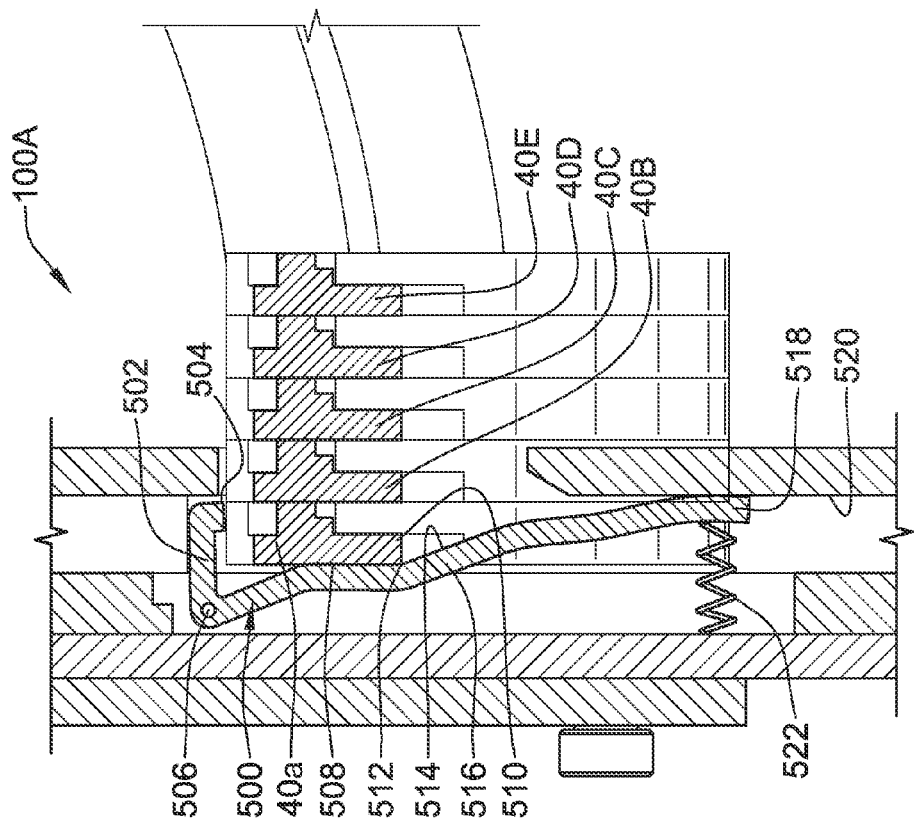
FIGS. 13A-13D are partial cutaway views of the improved apparatus showing the relative positions of the selected improved locking clip of FIGS. 12A-12D and an adjacent supply of improved locking clips as the selected improved clip advances from its initial position in the improved apparatus to its closed position fastening the tubing to a wire mesh, as depicted in corresponding FIGS. 12A-12D.
Figure 12A:
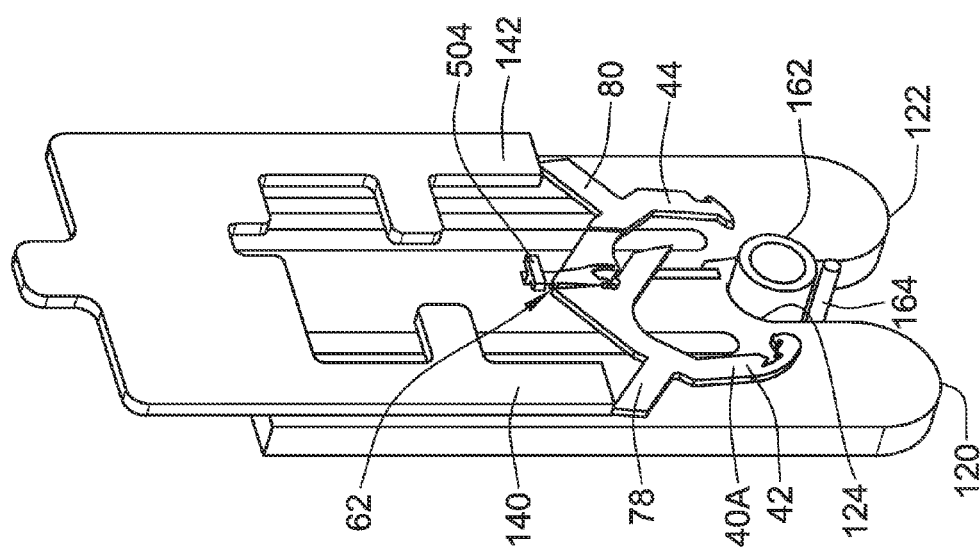
FIGS. 12A-12D are a series of perspective views of a selected improved locking clip situated in an improved apparatus of the invention showing the improved clip advancing from its initial position in the apparatus to its closed position fastening tubing to a wire mesh.

Thus, referring to FIGS. 12A and 13A, improved clip 40A (as described above in connection with FIG. 1A) is shown in position ready for application, with driver arms 140 and 142 adjacent abutment portions 78 and 80. Tubing 162 and wire 164 rest in cavity 124 and, although not shown in this figure, distal ends 120 and 122 of fingers 116 and 118 are raised slightly above the supporting surface that lies under bottom surfaces 228 of bilateral feet 220 and 222 (FIGS. 3A-3B).

As best can be seen FIG. 13A, feed detent lever 500, which includes a generally horizontally operating top portion 502 with a downwardly directed nose 504 at its forward end, pivots about a pivot pin 506 at its rearward corner. The feed detent lever curves downwardly and toward nose 504 from the pivot pin. It then extends further downwardly in a direction that is generally perpendicular to horizontally operating portion 502 to present a clip home wall 508 against which leading improved open locking clip 40A rests with the center portion of the clip 510 resting in corner 512 at the intersection of wall 508 and the angled ramp surface 514 of a forwardly angled bottom portion 516 of the feed lever. As can be seen in this figure, forwardly angled portion 516 extends into the space between side members 42 and 44 of clip 40A. The distal end 518 of portion 516 is biased against the back face 520 of body 374 (FIG. 11) by a spring 522 establishing an initial biased open phase in the operation of the feed detent lever in which clip 40A is admitted to cavity 110. A series of improved clips 40B-40E intended for later application are stacked up against improved clip 40A.

Figure 12B:
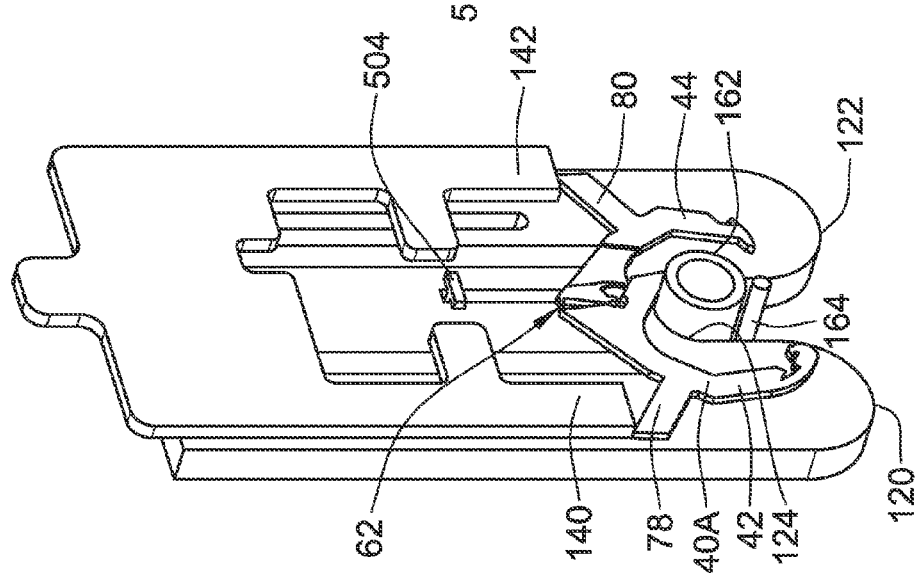
Figure 13B:
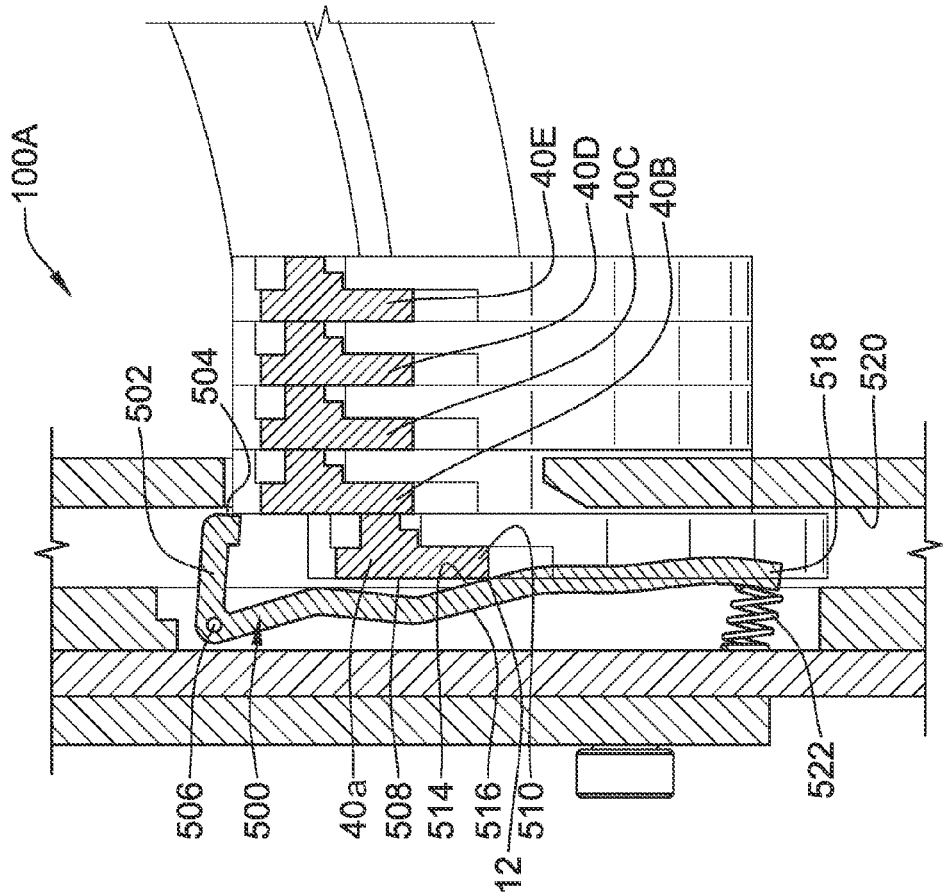

In FIGS. 12B and 13B, driver arms 140 and 142 apply force to abutment portions 78 and 80 to advance clip 40A downwardly. The force applied to the abutment portions must overcome the frictional resistance to downward clip movement resulting from the lateral pressure exerted on the clip by feed detent lever 500. Frangible link 62 thus must be sufficiently strong to ensure that this downward force against the frictional resistance will not cause the clip to begin closing before the clip engages tubing 162 and wire 164. When the clip engages tubing 162, further downward clip movement is barred so that the force applied to abutment portions 78 and 80 can exceed the force applied to advance the clip causing the side members of the leading improved clip to begin pivoting inwardly, first breaking frangible link 62 and then moving together until the clip side members are locked about the tubing and wire.

The downward movement of improved clip 40A causes it to engage ramp surface 514 of feed detent lever 500, applying a lateral force as the clip moves downwardly and thereby pivoting the feed detent lever backward against the bias of compression spring 512. The pivoting of the feed detent lever not only regulates the downward travel of the clip but also tilts portion 502 so that nose 504 moves downwardly to bar clip 40B and succeeding clips 40C-40E from entering the clip cavity. This initiates the barrier phase of the operation of the feed detent which helps insure reliable, generally jam-free operation of the improved apparatus.

Figure 13C:
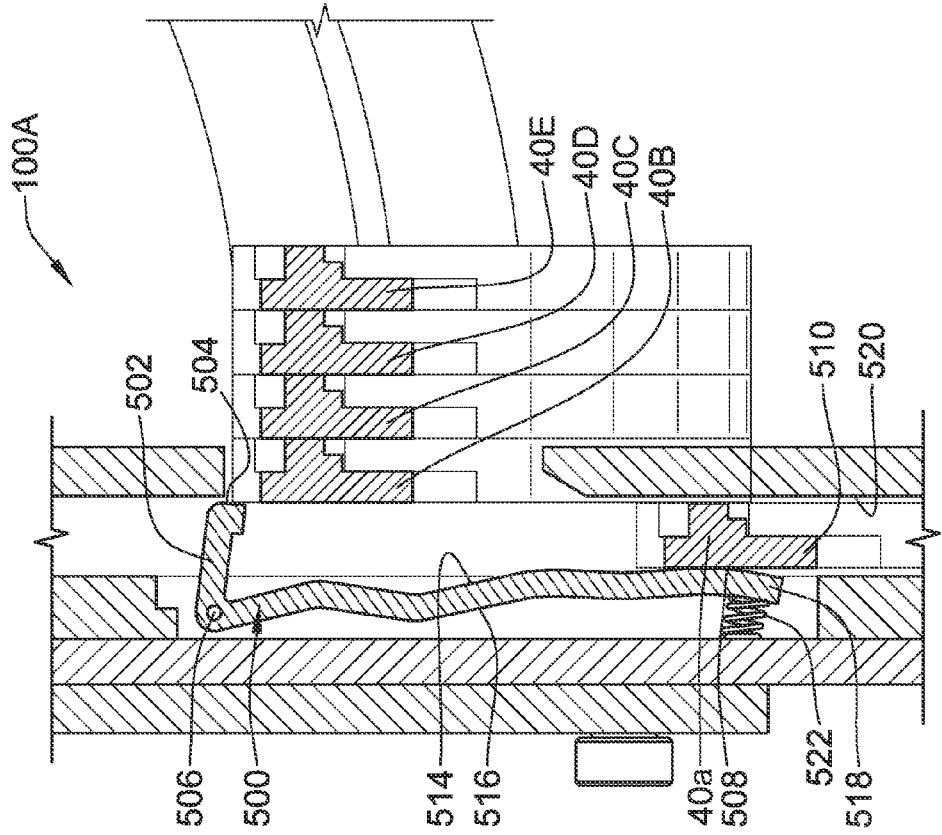
Figure 12C:
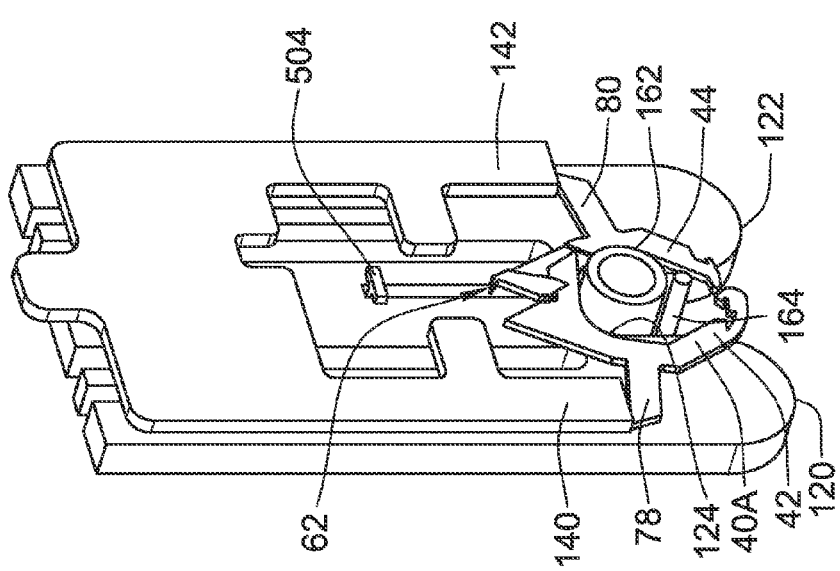
Figure 13D:
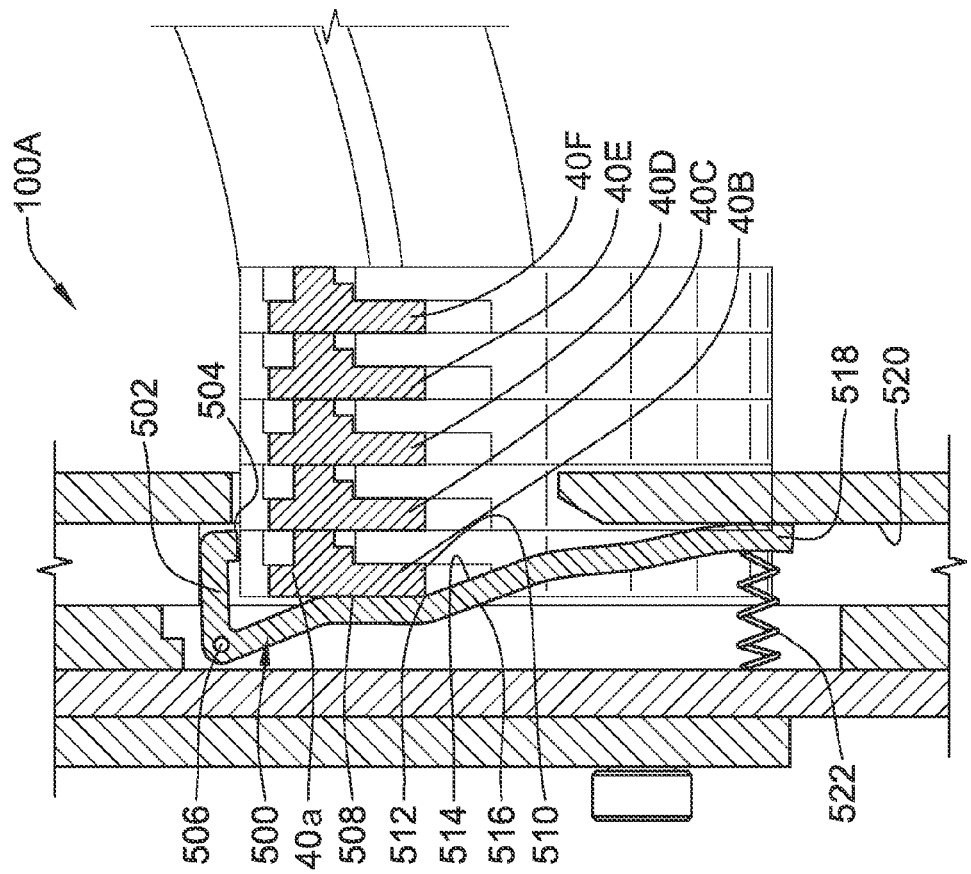

In FIGS. 12C and 13C, it can be seen that the continued downward movement of the clip has caused the feed detent lever to pivot back even further, so that lever nose 504 continues to block any further lateral movement of adjacent supply clip 40B. This ensures that only selected clip 40A is engaged by driver arms 140 and 142. Also, in FIG. 12C the clip is now abutting tubing 162 so that the continued downward movement of the driver arms causes frangible link 62 to break and side members 42 and 44 to begin closing about tubing 162 and wire 164.

Figure 12D:
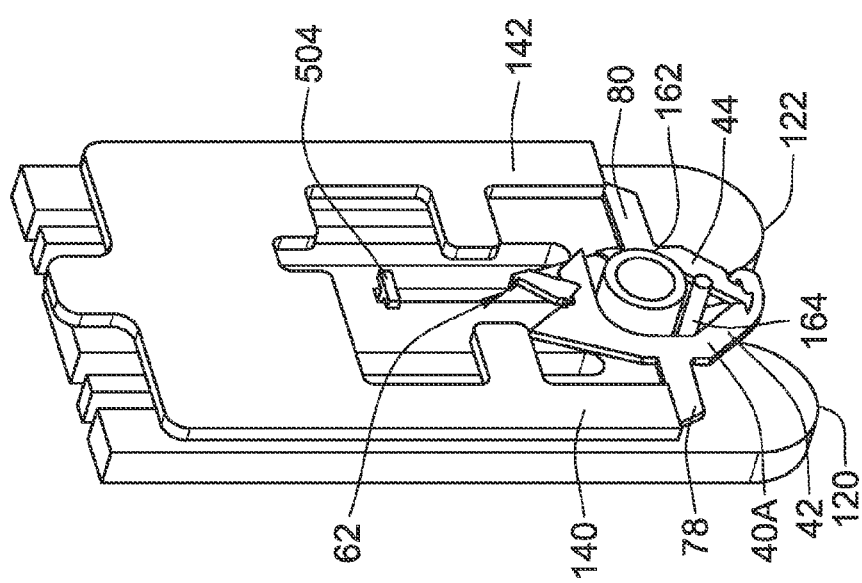

Finally, in FIG. 12D the clip side members are pivoted further together and interlocked about the tubing and wire just prior to removal of the apparatus. When the apparatus is removed, interlocked clip 40A slides out of apparatus 100A allowing the feed lever to snap back into the start position depicted in FIG. 13D under the bias of spring 522 so that clip 40B enters the clip cavity and clip 40F moves into view in the figure. Improved clip 40B thereby becomes the next leading clip acted upon by apparatus 100A.

The operation of early apparatus 100 may proceed as described below, in a continuous even motion from step 1 through step 6.

1. A series of clips corresponding to leading clip 114 are loaded in magazine 104 of early apparatus 100, and move downwardly in the magazine until the leading clip is resting in application section 102 against detents 370.
2. Relatively rigid, generally cylindrical articles are provided on a supporting surface.
3. Apparatus 100 is positioned over the articles so that the articles generally reside in the space between fingers 116 and 118, with the distal ends 120 and 122 of the fingers resting on the supporting surface.
4. The operator then presses down upon knob 390, moving control rod 106 downwardly and causing clip driver 138 to move downwardly and link pins 344 and 346 also to move downwardly in slots 348 and 350 of body cover 304, while engaging slots 308 of the grabber arms. This causes the grabber arms to pivot inwardly and engage the bottommost article resting on the supporting surface. The articles are contained in the space between the grabber arms as the grabber arms lift the apparatus away from the supporting surface.
5. As the control arm continues to be pressed downwardly, driver arms 140 and 142 of driver 138 engage abutment portions 154 and 156 of leading clip 114, causing the leading clip to move past detents 370 until it engages the topmost article. As the locking clips come into engagement with the tubing, the continued downward movement of driver 138 causes the side members of clip 114 to pivot inwardly through the stages depicted in FIGS. 4B-4D until the clip is locked about the members as shown in FIG. 4D.
6. The operator then releases the apparatus by permitting the control arm to return to the position depicted in FIGS. 2 and 3 under the force of spring 384, lifts the apparatus away from the now clipped intersection thereby releasing the clips and articles, and moves to the next location requiring application of a clip.

When improved apparatus 100A with bilateral feet 200 and 222 and feed detent lever 500 is used however, the process will proceed as follows:

1. A series of improved open locking clips are loaded in magazine 104, and move downwardly in the magazine until the leading improved clip is resting in application section 102 against feed detent lever 500.
2. Relatively rigid, generally cylindrical articles such as tubing 162 and wire 164 are provided on a supporting surface.
3. Improved apparatus 100A is positioned on the supporting surface as feet 220 and 222 are slid under wire 165 by positioning the forward tips 236 of the feet adjacent to the wire, and pushing forward so that the wire rides up along ramps 230 until it comes to rest on landing 232 against rear walls 234. Since tubing 162 rests on top of the wire mesh, raising the wire mesh off the support surface in this fashion will also raise the tubing, prepositioning it in cavity 124 of the apparatus as shown in FIGS. 3A and 3B.
4. The operator then presses down upon knob 390, moving control rod 106 downwardly and causing clip driver 138 to move downwardly and link pins 344 and 346 also to move downwardly in slots 348 and 350 of body cover 304, while engaging slots 308 of the grabber arms. This causes the grabber arms to pivot inwardly and engage the tubing and wire so that the tubing and wire are contained in the space between the grabber arms.
5. As the control arm continues to be pressed downwardly, driver arms 140 and 142 of driver 138 engage abutment portions 78 and 80 of the leading clip (e.g., clip 40A of FIGS. 12A-12D), causing the leading clip to move along feed detent lever 500 until it engages the tubing, with feed detent lever 500 operating as noted above to prevent premature movement or jamming of the adjacent improved clips. The continued downward movement of driver 138 causes the side members of the leading improved clip to pivot inwardly first breaking frangible link 62 and then moving its side members together until the clip is locked about the tubing and wire as shown in FIG. 12D.
6. The operator then releases the apparatus by permitting the control arm to return to the position depicted in FIGS. 2 and 3 under the force of spring 384. The operator then lifts the apparatus away from the now clipped tubing together and wire thereby releasing the clip and enabling the next improved clip to move into place for application at the next location requiring a clip.

The improved apparatus, as operated above, is able to achieve a smooth and well balanced operation all the way through the action of the driver blade moving downwardly to advance and close the clip, the resistance of the improved clip to premature closing and the opening of the frangible link in the clip at the appropriate time to produce a repeatable, reliable and secure closure.

While the improved apparatus of the present invention is illustrated as manually operable, the control arm may be supplied with an automatic hydraulic or pneumatic driver which would move the control arm through the motion described above, albeit under hydraulic or pneumatic force initiated through a separate control or switch. In yet another alternative embodiment, a crank-up spring loaded system may be provided by which the operator loads up a spring with a potential application force and then releases that force to drive the control arm through the operation as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus adapted to hold a series of open locking clips and to deliver and apply the leading open locking clip of the series to an article resting on a surface comprising:

a housing having a clip cavity for receiving the leading open locking clip and a pivotable feed detent lever for barring the entry of succeeding open locking clips of the series to the cavity until the leading clip is delivered, applied and removed from the apparatus; and a control arm linked to first and second apparatus members, the control arm being movable between a start position and an end position to successively actuate the first and second apparatus members, the first apparatus member adapted to contain and lift the article into position before delivery of the leading open locking clip, the first apparatus member including grabber arms with inwardly directed distal ends to engage the article and hold it in a capture area between the grabber arms above the inwardly directed distal ends of the grabber arms, where the grabber arms are pivotally attached to the housing and include V-shaped slots with first and second legs and link pins adapted to move downwardly in response to operation of the control rod, the link pins first engaging the first leg of the slot to pivot the grabber arm inwardly to a closed position and then engaging the second leg of the slot to maintain the grabber arms in the closed position, and the second apparatus member adapted to deliver the open locking clip to the article and to apply the locking clip to the article before removal of the clip from the apparatus.

2. The apparatus of claim 1 in which the feed detent lever is adapted to pivot between an initial biased open phase in which the leading open locking clip is admitted to the clip cavity and a barrier phase in which the passage of succeeding open clips into the clip cavity is barred by the feed detent lever.

3. The apparatus of claim 2 in which the feed detent lever includes a generally horizontally operating top portion adapted to admit the leading open locking clip when the feed detent lever is in the initial biased open phase and to bar the passage of succeeding open locking clips when the feed detent lever is moved against the bias into the barrier phase.

4. The apparatus of claim 3 in which the feed detent lever includes a forwardly angled bottom portion having a ramp surface and a pivot between the top and bottom portions, the bottom forwardly angled portion being positioned when the feed detent lever is in the initial biased open phase to intercept the leading locking clip along the ramp surface so that the leading locking clip advances along the ramp surface as it is delivered to the article pivoting the bottom forwardly angled portion thereby moving the top generally horizontally operating portion downwardly to bar the passage of succeeding open clips into the clip cavity.

5. The apparatus of claim 1 including a housing with a cavity for receiving the article resting on a surface and at least one foot projecting outwardly from the housing adjacent the article-receiving cavity, the foot having a top ramp surface angled upwardly from the bottom of the foot.

6. The apparatus of claim 5 in which the top ramp surface leads up to and intersects a generally horizontal landing adjacent to the housing.

7. The apparatus of claim 5 including bilateral feet positioned on opposite sides of the cavity for receiving the article resting on a surface.

8. The apparatus of claim 5 in which at least a portion of the bottom of the foot is generally parallel to the landing and the ramp surface is at an angle of 15 to 45 degrees to the foot portion.

9. The apparatus of claim 5 in which at least a portion of the bottom of the foot is generally parallel to the landing and the ramp surface is at an angle of 22 to 35 degrees to the foot portion.

10. The apparatus of claim 1 in which the second apparatus member includes driver arms to move the leading open clip into engagement with the article and then to close the clip about the article.

11. The apparatus of claim 1 in which the locking clip includes two pivotally attached side members and the second apparatus member includes two driver arms to interact with the side members to move the open locking clip into engagement with the article and then to close the locking clip about the article.

12. An apparatus as in claim 1 for confining at least two adjacent articles to be secured together where at least one of the articles rests on a surface and the inwardly directed distal ends of the grabber arms engage the article resting on the surface while the remaining articles are contained in the capture area between the grabber arms.

13. The apparatus of claim 1 in which the control arm is operable by a driver chosen from the group consisting of: a hydraulic driver that when activated moves the control arm under hydraulic force, a pneumatic driver that when activated moves the control arm under pneumatic force, or a spring loaded with a potential application force that when activated moves the control arm in response to the force supplied by the spring.

* * * * *